United States Patent
Morton et al.

(10) Patent No.: US 7,095,774 B2
(45) Date of Patent: Aug. 22, 2006

(54) CATHODES FOR FLUORINE GAS DISCHARGE LASERS

(75) Inventors: Richard G. Morton, San Diego, CA (US); Timothy S. Dyer, Oceanside, CA (US)

(73) Assignee: Cymer, Inc., San Diego, CA (US)

( * ) Notice: Subject to any disclaimer, the term of this patent is extended or adjusted under 35 U.S.C. 154(b) by 39 days.

(21) Appl. No.: 10/672,181

(22) Filed: Sep. 26, 2003

(65) Prior Publication Data

US 2004/0066827 A1   Apr. 8, 2004

Related U.S. Application Data

(63) Continuation-in-part of application No. 10/638,247, filed on Aug. 7, 2003, now Pat. No. 6,937,635, and a continuation-in-part of application No. 10/629,364, filed on Jul. 29, 2003, and a continuation-in-part of application No. 10/104,502, filed on Mar. 22, 2002, now Pat. No. 6,690,706, and a continuation-in-part of application No. 10/081,589, filed on Feb. 21, 2002, now abandoned, and a continuation-in-part of application No. 09/953,026, filed on Sep. 13, 2001, now Pat. No. 6,711,202.

(51) Int. Cl.
*H01S 3/22* (2006.01)
*H01S 3/097* (2006.01)

(52) U.S. Cl. ........................ 372/87; 372/55

(58) Field of Classification Search ............ 372/55–61, 372/81–83, 85–88, 90
See application file for complete search history.

(56) References Cited

U.S. PATENT DOCUMENTS 3,579,384 A * 5/1971 Abens ..................... 429/343
3,607,015 A * 9/1971 Low et al. ................ 423/489
4,240,044 A   12/1980 Fahlen et al. ............. 331/94.5
4,245,194 A   1/1981 Fahlen et al. ............. 331/94.5
4,414,488 A   11/1983 Hoffmann et al. ........... 315/39
4,546,482 A   10/1985 Bagaglia et al. ............ 372/86
4,547,886 A   10/1985 Kaminski et al. ............ 372/59
4,686,682 A   8/1987 Haruta et al. ............... 372/87
4,703,490 A   10/1987 Brumme et al. ............. 372/86
4,774,714 A   9/1988 Javan ..................... 372/109

(Continued)

FOREIGN PATENT DOCUMENTS

JP    2631607    7/1997    ............ 3/38

OTHER PUBLICATIONS

Nguyen, Thinh, et al., "Diffusion Bonding—An Advanced Material Process for Aerospace Technology", http://www.vacets.org/vtic97/ttnguyen.htm.

*Primary Examiner*—Armando Rodriguez
(74) *Attorney, Agent, or Firm*—William C. Cray

(57) ABSTRACT

A fluorine gas discharge laser electrode for a gas discharge laser having a laser gas containing fluorine and a method for manufacturing an electrode is disclosed. The electrode may include a copper and copper alloy body having an upper curved region containing a discharge footprint and a lower portion. In one aspect of an embodiment of the present invention, the upper region may include copper and the lower region may include a copper alloy. A portion of the electrode facing a gas discharge region may be formed in an arcuate shape extending into straight line portions on either side of the arcuate portion. The straight line portions may terminate in vertical straight sides.

10 Claims, 28 Drawing Sheets

U.S. PATENT DOCUMENTS

| | | | |
|---|---|---|---|
| 4,810,611 A * | 3/1989 | Ziolo et al. | 430/111.1 |
| 4,813,127 A | 3/1989 | Braski et al. | 29/825 |
| 4,876,693 A | 10/1989 | Lucero et al. | 372/82 |
| 4,959,840 A | 9/1990 | Akins et al. | 372/57 |
| 5,070,513 A | 12/1991 | Letardi | 372/83 |
| 5,247,534 A | 9/1993 | Muller-Horsche | 372/58 |
| 5,359,620 A | 10/1994 | Akins | 372/58 |
| 5,535,233 A | 7/1996 | Mizoguchi et al. | 372/87 |
| 5,557,629 A | 9/1996 | Mizoguchi et al. | 372/87 |
| 5,586,134 A | 12/1996 | Das et al. | 372/38 |
| 5,771,258 A | 6/1998 | Morton et al. | 372/57 |
| 6,038,055 A | 3/2000 | Hansch et al. | 359/279 |
| 6,654,403 B1 * | 11/2003 | Ujazdowski et al. | 372/87 |
| 6,810,061 B1 * | 10/2004 | Hori et al. | 372/87 |
| 2003/0012234 A1 | 1/2003 | Watson et al. | 372/25 |
| 2003/0031216 A1 | 2/2003 | Fallon et al. | 372/29.01 |
| 2003/0138019 A1 | 7/2003 | Rylov et al. | 372/58 |

* cited by examiner

FIG. 2. Cathode Profile Changes

Typical Axial Anode Erosion Profile, 3 Bp in 4 KHz ArF

FIG. 6 LOCAL C26000 ANODE AND CATHODE SEGMENT CORROSION RATES (mm/Bp)
TD133 SEGMENTED CATHODE TEST, 2.3 Bp, 2.5 KHz, ArF, 1100V

FIGURE 1. Cathode or Anode Surface Temperature Control Using Diffusion Bonding Technology.

Current return tangs removed to increase inductance at end of discharge region.

CATHODES FOR FLUORINE GAS DISCHARGE LASERS

This application is a continuation in part of U.S. patent application Ser. No. 09/953,026, filed on Sep. 13, 2001 now U.S. Pat. No. 6,711,202, entitled DISCHARGE LASER WITH POROUS INSULATING LAYER COVERING ANODE DISCHARGE SURFACE, with inventors Morton, et al., published on May 2, 2002, Pub. No. US20020051478 A1; U.S. patent application Ser. No. 10/081,589, entitled ELECTRIC DISCHARGE LASER WITH TWO-MATERIAL ELECTRODES, filed on Feb. 21, 2002, now abandoned with inventors Morton et al., published on Oct. 24, 2002, Pub. No. US2002015467A10; U.S. patent application Ser. No. 10/104,502, entitled HIGH REP-RATE LASER WITH IMPROVED ELECTRODES, filed on Mar. 22, 2002, now U.S. Pat. No. 6,690,706 with inventors Morton, et al., published on Dec. 19, 2002, with Pub. No. US20020191661A1; U.S. patent application Ser. No. 10/629,364, entitled HIGH REP-RATE LASER WITH IMPROVED ELECTRODES, filed Jul. 29, 2003; U.S. patent application Ser. No. 10/638,247, entitled HIGH REP-RATE LASER WITH IMPROVED ELECTRODES, filed Aug. 7, 2003; now U.S. Pat. No. 6,937,635 the disclosures of all of the above being hereby incorporated by reference.

This case is also related to application Ser. No. 10/672,722, entitled "ANODES FOR FLUORINE GAS DISCHARGE LASERS," and application Ser. No. 10/672,182, entitled "ELECTRODE SYSTEMS FOR FLUORINE GAS DISCHARGE LASERS," filed on the same day as this application and assigned to the common assignee of this application, the disclosures of which are hereby incorporated by reference.

FIELD OF THE INVENTION

The field of the invention relates to electrodes and electrode systems for fluorine gas discharge lasers.

BACKGROUND OF THE INVENTION

The above referenced previously filed co-pending applications relate to various aspects of electrodes, particularly for electrode systems utilized in gas discharge lasers, and more particularly gas discharge lasers utilizing a laser gas containing fluorine, referred to as fluorine gas discharge lasers. In addition U.S. patent application Ser. No. 10/243,102, fled on Sep. 13, 2002, entitled TWO CHAMBER F2 LASER SYSTEM WITH F2 PRESSURE BASED LINE SELECTION, with inventors Rylov, et al., published on Jul. 24, 2003, with Pub. No. US20030138019A1, U.S. patent application Ser. No. 10/210,761, filed on Jul. 31, 2002, entitled CONTROL SYSTEM FOR A TWO CHAMBER GAS DISCHARGE LASER, with inventors Fallon et al., published on Feb. 13, 2003, with Pub. No. US20030031216A1; U.S. patent application Ser. No. 10/187,336, filed on Jun. 28, 2002, entitled SIX TO TEN KHZ, OR GREATER GAS DISCHARGE LASER SYSTEM, with inventors Watson, et al., published on Jan. 16, 2003, Pub. No. US20030012234A1, and U.S. Pat. No. 6,584,132, entitled SPINODAL COPPER ALLOY ELECTRODES, issued to Morton, on Jun. 24, 2003 discuss various aspects of fluorine gas discharge lasers and electrode requirements for such lasers as well as other laser life, particularly chamber life issues surrounding the operation of such lasers.

It is well known, as the above references discuss that the environment for electrodes in a fluorine gas discharge laser is complex and severe. Increasing requirements for output laser power, resulting in, among other things, higher voltages across the electrodes, and higher total power dissipated in the discharges over electrode life, exacerbating the severity of he gas discharge laser chamber environment. The need to increase pulse repetition frequencies well above 4000 Hz, and even up to double that repetition rate during pulse bursts, equally causes problems in maintaining electrode lifetimes. The need for more pulses per burst and other well known and increasing severe demands on the gas discharge laser electrodes, particularly in fluorine gas discharge lasers has lead to and will continue to lead to demands for improvements in electrode and electrode assembly technologies. Some of which are more specifically directed to cathodes, and/or their assembly as part of the laser chamber and some more specifically to anodes and/or their particular assembly. The electrical, electromagnetic, physical and chemical influences on electrode lifetimes continually place challenges on the designs for electrodes and their interfaces with other parts of the chamber, including the gas discharge region between the electrodes themselves. The present application addresses some of the above noted concerns.

SUMMARY OF THE INVENTION

A fluorine gas discharge laser electrode for a gas discharge laser having a laser gas containing fluorine is disclosed which may comprise a copper and copper alloy cathode body having an upper curved region containing the discharge footprint for the cathode comprising copper and a lower portion comprising a copper alloy, with the facing portion of the electrode if formed in a arcuate shape extending into straight line portions on either side of the arcuate portion, the straight line portions terminating in vertical straight sides, with the boundary between the copper including at least the arcuate portion, the electrode may comprise a bonded element machined from two pieces of material the first made of copper and the second made of a copper alloy bonded together before machining. The electrode may also comprise a first and a second elongated lopsided V-shaped groove formed along substantially all of the elongated electrode body forming a discharge receiving ridge between the first and second lopsided V-shaped grooves, with a differentially faster eroding material filling the first and second lopsided V-shaped grooves. also disclosed is an electrode system in which the one electrode, e.g., the cathode bows during operation and may comprise at least one of a first and second elongated gas discharge electrode being machined to form a crown to receive the gas discharge that compensates for the bowing of at least one of the gas discharge electrodes during operation of the fluorine gas discharge laser.

DETAILED DESCRIPTION OF PREFERRED EMBODIMENTS

Figure 1:
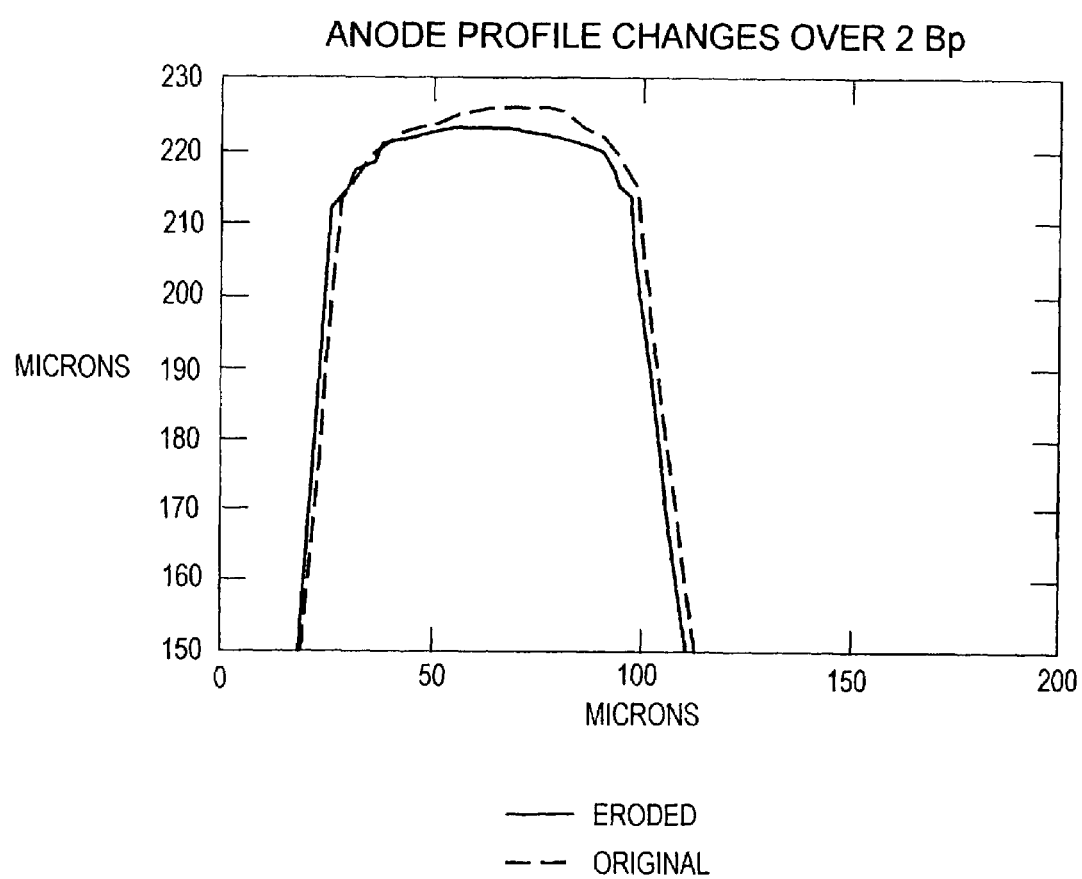
FIG. 1 shows a graph of anode profile changes over Bp.

Cathode erosion in fluorine containing gas discharge chambers for gas discharge lasers comprising a laser gas containing fluorine, e.g., Krypton Fluorine ("KrF") or Argon Fluorine ("ArF") and molecular fluorine ("F2") lasers (herein referred to a "fluorine gas discharge lasers") is very different from anode erosion. Anode wear is dominated by $F^-$ ion erosion corrosion, while cathode wear is dominated by high current ionized noble gas ion ablation. In ArF excimer laser chambers, e.g., applicants observed that cathodes erode much more slowly than anodes. Cathode erosion rates have been found by applicants to be typically less than 30% of anode erosion rates. For brass alloys, cathode erosion rates have been found to trend relatively linearly with the Zn content in the alloy.

Applicants believe this linear trending with the Zn content of the alloy is due to a combination of the mechanisms of Zn vaporization and preferential sputtering from the parent alloy. In contrast to anode corrosion, cathodes do not naturally grow self-passivating metal fluoride layers. Therefore, it is not possible to rely on a naturally grown "reef"—like coating to passivate the alloy surface and protect a cathode from erosion. Due to energy and discharge stability requirements, slow eroding alloys appear to outperform engineered passivated/coated systems, i.e., attempts to artificially grow or deposit "reef"—like self passivating material on the cathode. In addition, cathode wear morphology (pitting and roughness changes during use) appears to impact the erosion rates of the opposing anode. Applicants have determined that there is a clear interaction of cathode and anode regarding material erosion rates. Therefore, it is desirable for both the anode and cathode to be a compatible pair for optimum fluorine gas discharge laser chamber lifetimes.

In general, single phase materials such as Ni, and low melting temperature brass alloys (e.g., Zn levels >20%) appear to be better for anode erosion rates. Cu—Zn cathode alloys containing less than 15% Zn appear to wear more slowly than high Zn containing brass alloys, however they appear to pit as cathodes, apparently then accelerating anode wear. In general, the ideal cathode material will both erode slowly and stay relatively smooth over the chamber lifetime.

As part of applicants' efforts to prolong chamber lifetime, and more specifically electrode life, in applicants' assignee's products, e.g., in 7XXX laser products, applicants have evaluated candidate alloys for both long life anodes and cathodes. In addition, applicants have investigated optimizations for composite cathodes (e.g., for differential erosion) manufactured, e.g., via bonding processes, e.g., diffusion bonding of Cu alloys. A series of 2 KHz laser pulse repetition rate segmented anode and cathode tests were run. In these tests, applicants investigated both anode and cathode corrosion rates, e.g., as a function of alloy composition. Older style fluorine gas discharge chambers were utilized, e.g., 6XX0 chambers as have been utilized in applicants' assignee's 6XX0 products were built and run using segmented anodes or cathodes. By using multi-component anodes and cathodes, applicants were able to make "apples to apples" comparisons of material erosion rates and to investigate anode/cathode interactions.

Using baseline 2 KHz KrF and ArF laser chambers for purposes of conducting the evaluations. In order to minimize electrode geometry effects, the same anode and cathode shapes were used for all tests. All ArF chamber tests used the same cathode part as are used in applicant's assignee's ArF products and an anode, also utilized in applicants' assignee's ArF products. The KrF chambers used a KrF cathode and a segmented anode shapes similar to those used in the ArF tests. For the segmented cathode tests, a ArF brass (C26000) anode was used opposite a cathode with 7 sample alloys fastened onto the C26000 substrate. All chambers were tested using standard gas fills for applicants' assignee's 6010A and 6010K products for a minimum of 2 billion pulses ("Bp") at 2 to 2.5 KHz gas discharge repetition rates on applicants' assignee's laser frames. Segmented electrode tests were run at fixed voltage (,e.g., 1100 volts), and operated in an optics-free mode. After the tests were completed, electrodes were removed, photographed, and erosion was measured via a NIST calibrated dial caliper (0.01 mm resolution).

In order to quickly investigate the effects of Zn, Cu, and Pb on electrode wear, a variety of readily available commercial copper alloys were selected by applicants for testing. Since alloy manufacturing was not under process control, all Cu alloy samples were heat treated and sent out for external chemical and metallurgical characterization. This was to investigate what impurities, if any, were typically in these Cu alloy systems. In general, Cu alloys are frequently recycled, therefore metallic and dissolved gas impurity levels are not well controlled. All Pb containing test alloy samples were annealed at 900 F to avoid hot-shortness (melting of the tertiary Pb alloy phase, which can cause void formation in the material), and non-Pb containing alloys were annealed at 1200 F. Special Zn and Ni alloys were not annealed. Table 1. Below, summarizes the alloys investigated in the segmented electrode studies. Total metallic impurities were measured via glow discharge mass spectrometry ("GDMS") by wt. High impurity values suggest extensive recycling of an alloy.

TABLE 1

Summary of Metal Alloys Tested in 2 KHz Segmented Anode and Cathode Chambers (TD094, TD095, TD98, TD103, TD106)

| Alloy # | ArF Tests (A or C) | KrF Tests (A or C) | Composition (Wt %) | Grain Size | Impurities (PPM wt) |
|---|---|---|---|---|---|
| 1 | A and C | A and C | Cu-99 | 125 | 350 |
| 2 | A and C | A and C | Cu-99, Zn-5 | 90 | 225 |
| 3 | A and C | A | Cu-90, Zn-10 | 89 | N/A |
| 4 | A and C | A and C | Cu-70, Zn-30 | 50 | 350 |
| 5 | A and C | A | Cu-60, Zn-40 | 45 | 554 |
| 6 | A and C | A and C | Cu-89, Zn-8.7, Pb-1.6 | 40 | >3500 |
| 7 | A | A | Cu-61.5, Zn-37, Pb-1.5 | >200 | >1000 |
| 8 | A and C | A and C | Cu-61.5, Zn-35.5, Pb-3 | 15 | >10000 |
| 9 | A | A | Cu-61.7, Zn-38, Pb-.3 | >200 | >5800 |
| 10 | A | A | Cu-59, Zn-38, Pb-3 | >200 | >700 |
| 11 | A | A | Cu-76, Zn-15, Pb 6, Sn 3 | >200 | >500 |
| 12 | A | A | Pb-99.9 | N/A | N/A |
| 13 | A and C | A | Ni-99.9 | >50 | N/A |
| 14 (GM) | A | A | Zn-91, Cu-5.5, Al-3.0 | N/A | N/A |
| 15 | A | A | Zn-91, Cu-1, Al-8 | N/A | N/A |

The above candidate alloys were selected to investigate the roles of Cu, Zn, and Pb on alloy erosion in both anode and cathode applications. Historical data had suggested that, e.g., free machining brass and cartridge brass alloys have been extensively used as chamber anodes and cathodes, therefore Cu, Zn, and Pb were chosen as critical alloying elements for study by applicants.

The metallurgy of brass is not very complicated. As Zn is added to copper, the material forms a 2 phase (banded) microstructure incorporating the Zn and Cu within the crystal grains. If Pb is added, a 3 phase microstructure develops since it is not soluble in Cu and Zn. Pb inclusions develop in Pb containing brasses during annealing at grain boundary interfaces. The grain boundaries, e.g., for free machining brass, have roughly 20 micron length and width dimensions and the lead inclusions form roughly 5 micron pockets at the junctions of several grain boundaries.

In general, Zn can be safely increased to 42 Wt % in brass alloys without creating materials that are brittle and/or difficult to fabricate into components. Zn helps strengthen the Cu alloy by reducing slip planes in the Cu microstructure. It also increases the sputter yield and vapor pressure of the Cu alloy, while also reducing melting temperature. Since Zn is also more reactive with Fluorine than Cu, the role of zinc in electrode erosion is of great interest.

Applicants also investigated the effects of cathode wear morphology on anode erosion, i.e., anode-cathode wear interactions. Applicants have been aware that cathode segments opposite self-passivating alloys ("reefing alloys) appear to wear quickly, and that anodes wear faster across from cathodes that pit. applicants have given these self-passivating structures the name "reef" because of the general appearance of a coral reef formed on the substrate electrode material in the self-passivating process and the terms are used interchangeably in this application.

Segmented electrode tests are a way that anode cathode interactions can be investigated in realistic time frames. In order to quantify electrode surface changes, cathode samples were evaluated for roughness changes by a so-called "Pocket Surf" Federal Profilometer, e.g., made by Mahr-Federal Inc. of Providence, R.I., and chemically investigated by SEM-EDX analysis.

Figure 2:
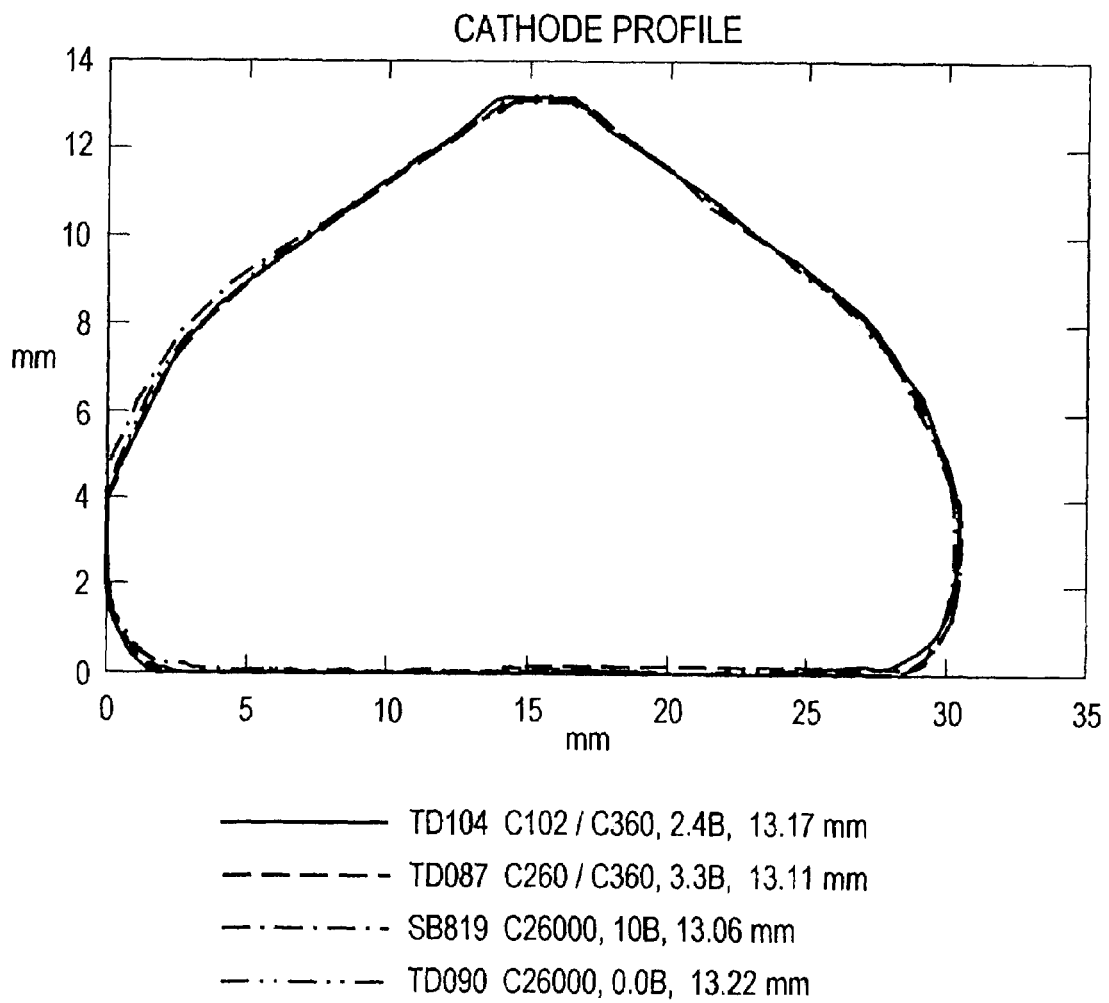
FIG. 2 shows a graph of cathode profile changes.
Figure 3:
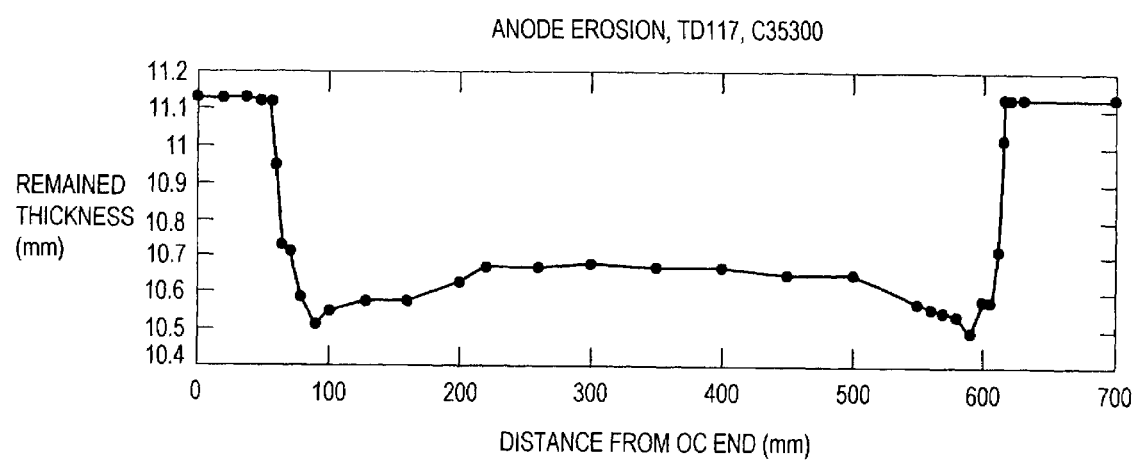
FIG. 3 shows a typical axial anode erosion profile.

Applicants have also observed that electrodes wear preferentially faster on the preionization tube side of a fluorine gas discharge laser chamber. In addition, the electrode ends tend to wear at a higher rate than the bulk of the electrodes, e.g., from within about 3 inches from a point at the end of the electrode at either end of the electrodes where gas discharge ceases to occur between the cathode and anode. Therefore, to avoid end effects, applicants only measured electrode erosion starting at 4 inches from each electrode end, across the entire electrode longitudinal length between those points. Erosion data for all electrode segments and samples was then compared based on millimeters of erosion per billion pulses ("Bp"). FIGS. 1–3, below, illustrate non-uniformity in electrode wear. FIG. 1 shows anode profile changes over Bp. FIG. 2 shows cathode profile changes. FIG. 3 shows a-typical axial anode erosion profile for a 4 KHz ArF laser over approximately 3 Bp.

Figure 4:
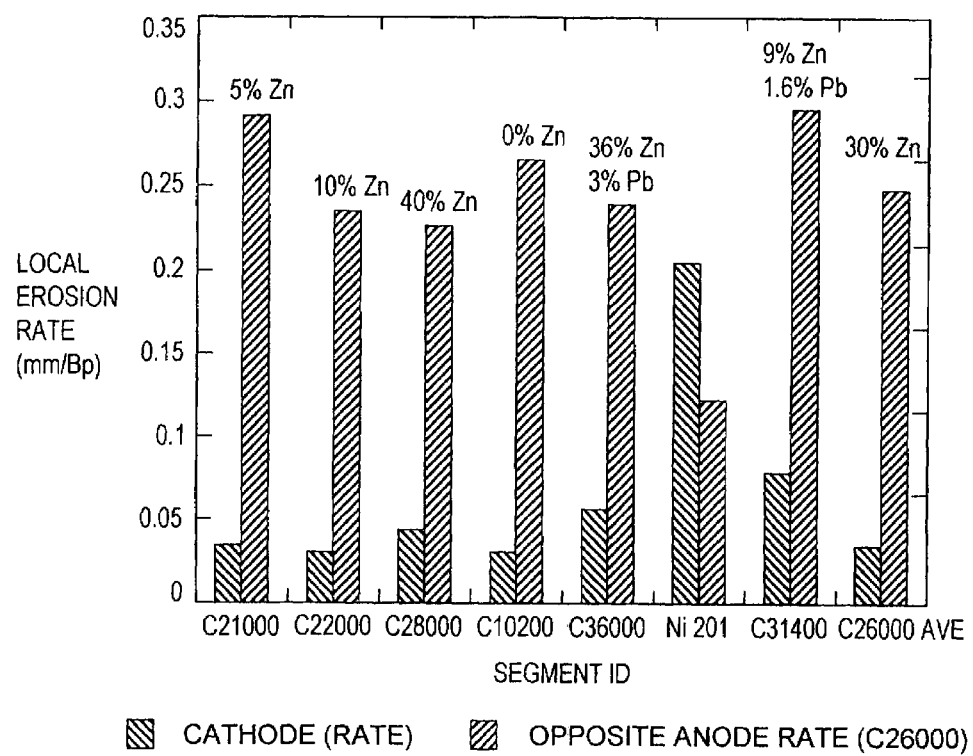
FIG. 4 shows a graph of cathode and anode erosion rates.
Figure 5:
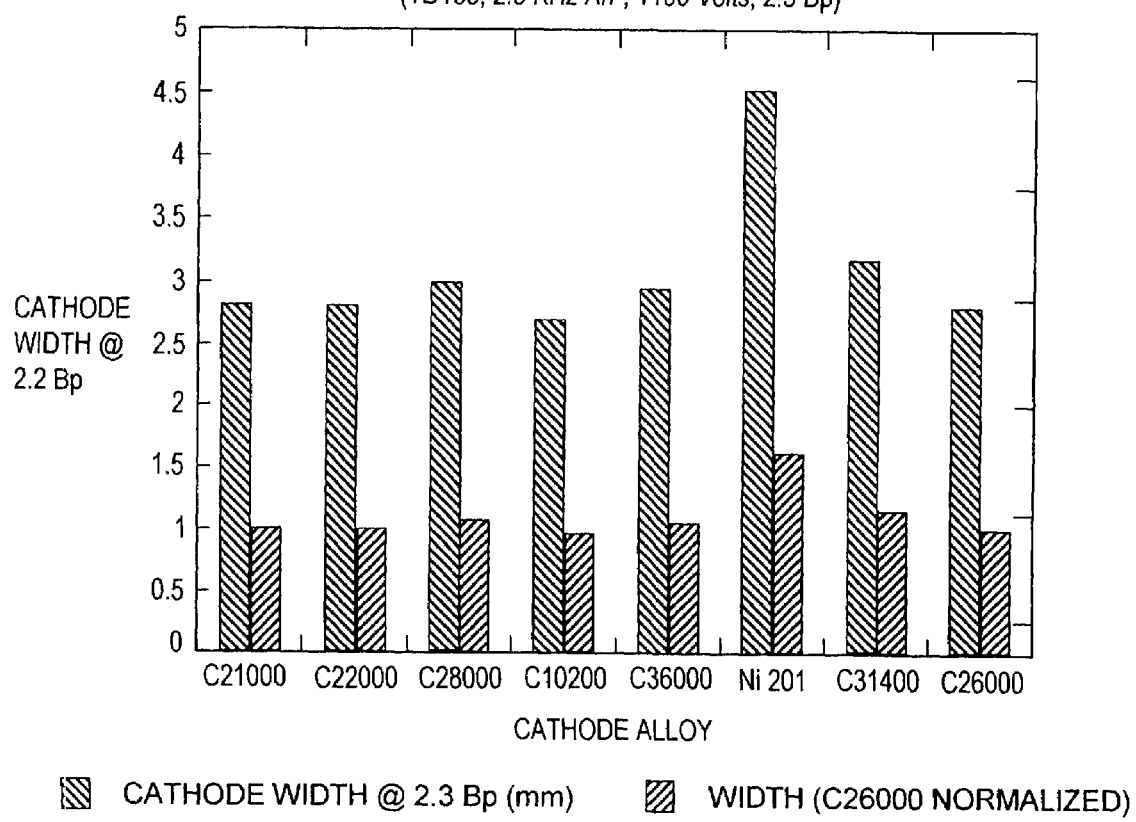
FIG. 5 shows cathode discharge width change for different materials.

Anode and cathode erosion including discharge width data for a segmented cathode are shown in FIGS. 4 and 5. FIG. 4 shows local C26000 cathode and anode erosion rates in mm/Bp for a 2.5 KHz ArF laser operating at 100 V $C_0$ for approximately 2.3 Bp. FIG. 5 shows cathode discharge width change for different materials for a 2.5 KHZ ArF gas discharge laser operating at 1100 V $C_0$ for approximately 2.3 Bp. One can see that pure Cu alloys appear to wear more slowly than Zn containing alloys. Pb-containing brass alloys, e.g., 6 and 7 in Table 1, and high Zn alloys, e.g., 5 in Table 1, also demonstrate more discharge widening (ArF) during the same relative number of pulses. In general, lowest cathode wear rates were observed with low Zn alloys (0–30% Zn). Pb containing cathode alloys were observed to wear faster in ArF laser discharges.

Figure 6:
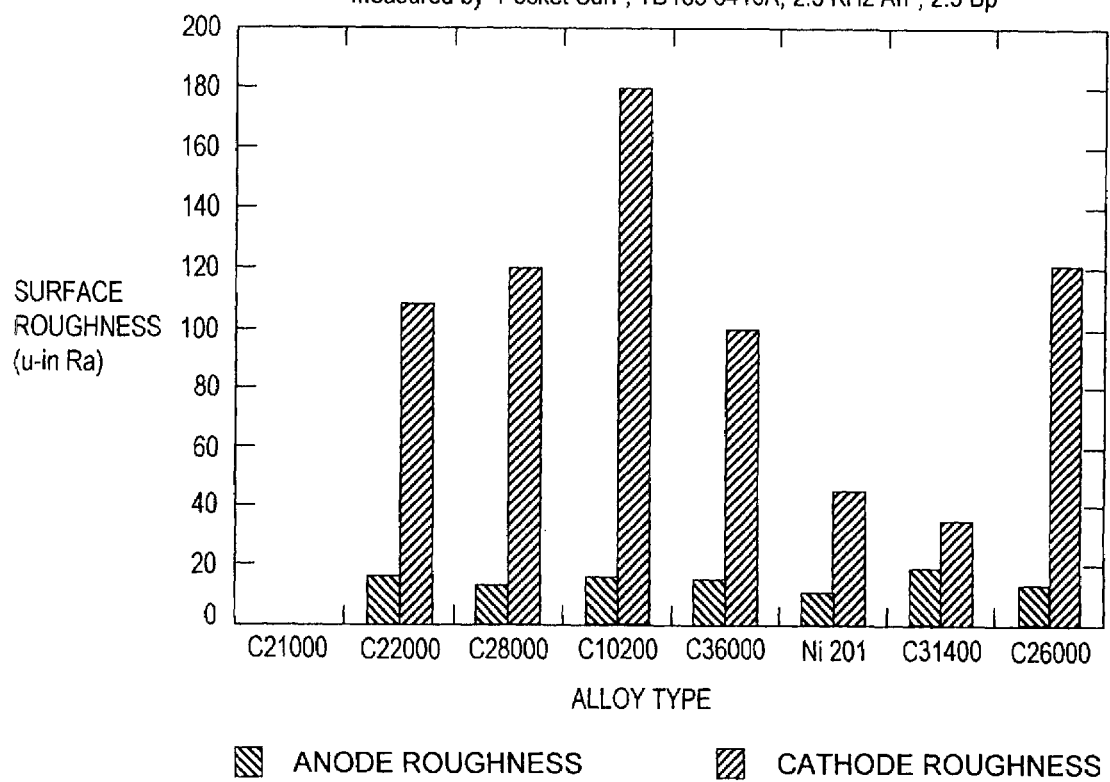
FIG. 6 shows a graph of surface roughness vs. alloy type.

FIG. 6 shows surface roughness vs. alloy type measured by "Pocket Surf," which is a mechanical profilometer. The measurement was after approximately 2.3 Bp in a 2.5 KHz ArF laser at 1100 V. Regarding surface roughness changes, cathode surface pitting appears to increase anode roughness and may accelerate the anode erosion rate. The anode, e.g., with the alloy No. 4 from Table 1, in general, appears smooth in comparison to all of the cathode samples after 2 Bp. Anode roughness is less than 20 micro inches roughness average ("Ra"), in comparison to cathode roughness (90 to 180 micro-inches Ra),. Ni produced the smoothest cathode and adjacent anode surface after erosion. Applicants believe this is related to Ni being a single phase material with a high melting temperature and forming a chemically weak fluoride. Ni does wear relatively fast as a cathode, however Ni reduces opposite anode erosion by 50% when compared to brass alloys. This may be due, however, to other than the composition of the Ni, e.g., the surface roughness of the Ni and relatively low opposite alloy 4 from table 1 anode erosion could also suggest that anode erosion is accelerated by cathode roughening with or without a Ni or mostly Ni cathode.

Figure 7:
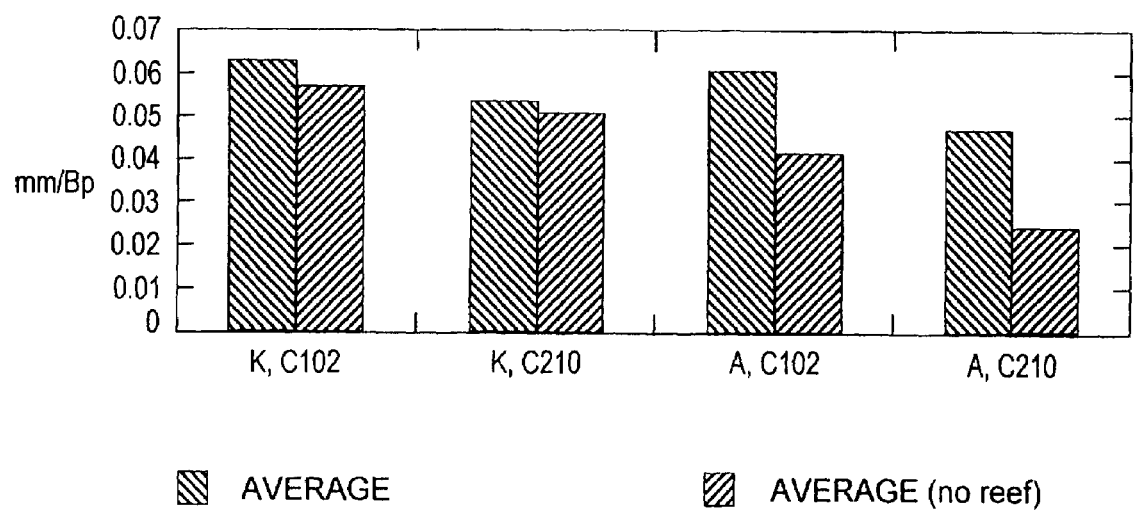
FIG. 7 is a graph illustrating cathode erosion.

Electrode erosion rates for the 2 KHz segmented anode and cathode tests were generally in line with erosion rates measured from electrodes tested in 4 KHz laser chambers. It appears that for ArF, repetition rate or duty cycle changes do not significantly change the anode or cathode wear mechanism. Comparison cathode erosion data for the other 4 segmented anode tests is summarized below. Applicants tested alloys 1 and 2 from Table 1 for cathodes apposite the segmented anodes. Cathode erosion rates were similar to those measured in the segmented cathode test presented above. In addition, low Zn containing cathodes could pit, potentially increasing anode wear rates. Pitting was far worse opposite self-passivating anode samples. It appears that the anode passivating coating (reef-like coating) accelerates cathode wear in Arf discharges. Applicants do not fully understand the mechanisms for this, since the reef changes both electrode roughness and surface electrical impedance. In general, cathodes in ArF chambers wear at 0.03–0.05 mm per billion pulses when the anode is noted. Applicants' assignee had been previously aware of a 9 Bp 4 Khz ArF laser chamber that demonstrated alloy 4 (from Table 1) cathode wear rate of 0.03–0.04 mm/Bp when run opposite an alloy 8 anode. Applicants also discovered that KrF cathodes tend to wear much faster than ArF cathodes, approximately 0.05–0.06 mm/Bp. This is about a 20–30% higher erosion rate for KrF cathodes vs. ArF cathodes. In addition, cathode wear rates are accelerated much more in ArF for reefing (self-passivating) anodes. Reefing anodes appear to damage ArF cathodes much more so than KrF cathodes made out of Cu—Zn alloys. Average cathode erosion data for the 4 segmented anode chambers can be viewed in FIG. 7.

The presence of an anode reef appears to increase cathode erosion in corresponding regions for both ArF and KrF applications. Applicants believe that the reason is that the reef causes spatially non-uniform electric field and current density. This may be mitigated by engineering more uniform artificially created reefs as opposed to naturally created reefs, as discussed in more detail below. For KrF reefing systems, cathode erosion rates are generally increased by 10 to 20% when compared to a non-reefing system. For ArF, the reef impact on cathode erosion rates appears to be even greater, where cathode erosion rates are increased by 30 to 45%. Increasing cathode erosion rates, however, may be acceptable if the anode does not wear and the self-passivating coating does not impact laser performance, which, again, may be the subject of so-called reef-engineering, as discussed below.

Cathode erosion in the KrF chambers is found to be higher than that in ArF chambers. This is believed to be due to the higher gas operating pressure in ArF chambers and/or the fact that Argon ions are lighter than Krypton ions, both of which lead to lower sputtering yields.

Figure 8:
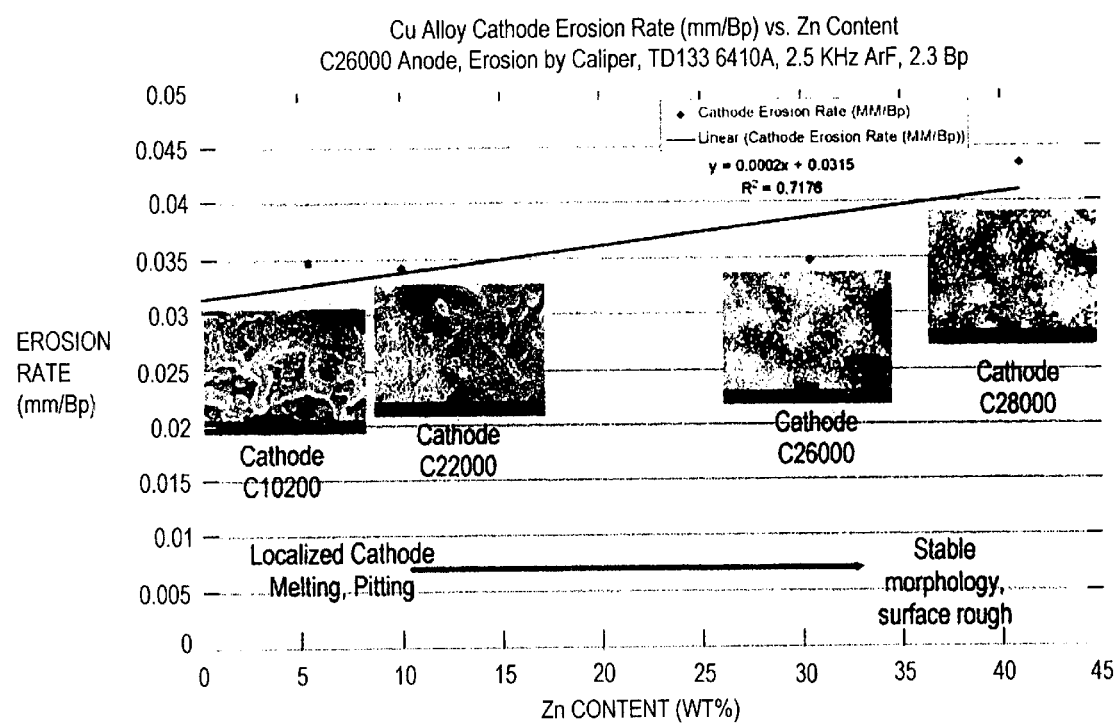
FIG. 8 is a graph showing worn anode and cathode surface morphology v. the composition of the material for an anode.

There appears also to be an interaction between the anode and the cathode. The magnitude of anode erosion appears to depend not only on the anode material composition itself (how it reacts with fluorine), but also on cathode surface morphology changes during erosion. Anodes appear to wear more slowly when facing a cathode material that erodes smoothly. The problem for both ArF and KrF laser chambers seems to be that it is not apparent what materials meet this criteria of slow wear, i.e., more slowly than the presently used brass alloys as a laser cathode. Nickel wears fast and smoothly as a cathode. Segmented cathode tests have demonstrated that the C26000 anode segment opposite this Ni cathode wore at 50% the rate of adjacent segments facing brass alloys. Anode roughness appears to be about the same for most segments. FIG. 8 shows worn anode and cathode surface morphology v. the composition of the brass for a C26000 anode in an ArF laser operated at 2.5 KHz for approximately 2.3 Bp.

Optimizing electrode life requires selection of materials that physically wear as slowly as possible, e.g., so as to prevent discharge gap widening, and that remain relatively smooth and homogeneous. For ArF laser chambers, applicants had been unsuccessful to date using naturally growing self-passivating alloys since they suffer from high rep rate performance issues, e.g., they act as insulators reducing the discharge energy locally and overall. Therefore, for ArF, the anode was believed to be required to be non-self-passivating and the cathode to wear as slowly as possible without pitting or roughening. From applicants' testing, Ni alloy cathodes produced the slowest C26000 anode wear rates, while pure Cu alloys produced the lowest cathode wear rate. However, Ni wears fast as a cathode alloy, therefore seeming to disqualifying it for an ArF chamber application. In a similar sense, using pure Cu alloy cathodes accelerates anode erosion due to pitting. As one increases the alloy Zn content to reduce pitting, the wear rate of the cathode increases. Therefore, cathode optimization would seem to require an engineering tradeoff considering surface roughening of the cathode vs. absolute wear rate.

For Cu—Zn alloys, it is apparent that, as Zn content is increased, cathodes wear faster. However, for Cu—Zn cathodes, the cathode wear rate is very slow compared to the anode wear rate. Though high cathode Zn levels increase erosion rates, there is still about a difference of 0.01 mm/Bp (20%) over a 40% range in Zn content. Therefore, using a 20–30% Zn alloy can yield a good combination of low cathode wear rate and anode "friendliness." FIG. 8 shows cathode wear rate in 2 KHz ArF laser chambers vs. Zn content. Pictures demonstrating cathode morphology are attached to the figure, helping demonstrate that some Zn is needed to suppress local non-uniform melting and pitting on the cathode surface when naturally occurring reefing is the operative mechanism. Applicants estimate from surface chemistry changes measured by SEM and XRF, that up to 15% of the surface Zn can be extracted by the discharge prior to ablation of the material.

Figure 9:
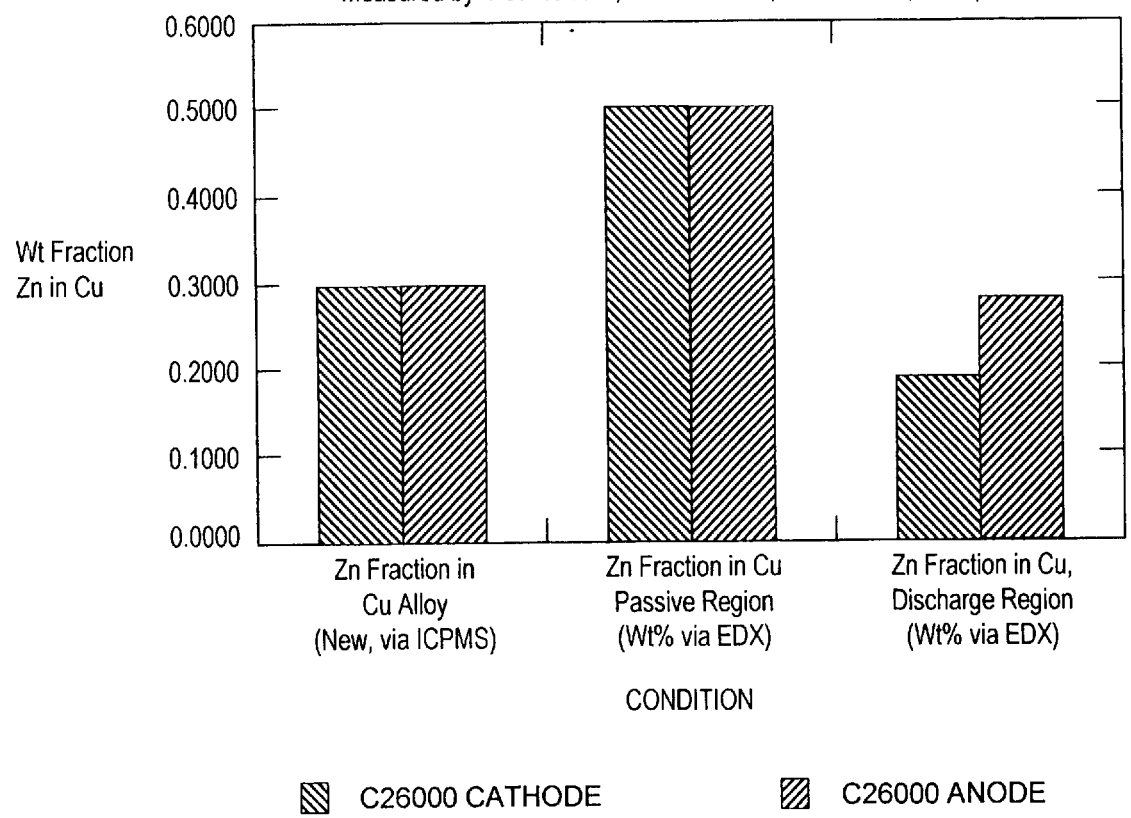
FIG. 9 shows an illustration of cathode related surface chemistry changes following exposure to a laser chamber gas discharge.

Cathode related surface chemistry changes following exposure to the laser chamber discharge are illustrated in FIG. 9 for a 2 KHz ArF laser at up to about 2.3 Bp. In general, applicants have observed that the cathode region exposed to the discharge is depleted of Zn by up to 15% absolute. In addition to having a higher sputter yield than Cu, applicants believe that the Zn may also vaporize at cathode operational temperatures. Cathode erosion results in local Zn depletion of the brass in the discharge footprint region. Zn has a relatively high vapor pressure for temperatures >500 C. Therefore applicants suspect weight loss due to Zn vaporization also, e.g., when cathode surface is >500° C. Visible melting of Cu and the presence of non-equilibrium $PbF_4$ deposits, as seen by XRD Analysis, on KrF cathodes ($PbF_4$ only being stable between 300° C. and 800° C.) suggests to applicants that a cathode surface temp >500° C. is realized in operatoin.

It may be difficult to decouple sputter and vapor pressure effects, since they would also suggest that Zn is preferentially removed from the brass. Regardless of what mechanism, it appears to applicants that there is a need for Zn at the cathode surface to suppress cathode pitting. Since cathode wear morphology appears to stabilize with Zn levels greater than 20%, applicants suggest using brass alloys with greater than 25% Zn as cathodes is one approach for optimum electrode life. Anode surface chemistry was observed to match the bulk electrode chemistry. Since the anode wears much faster than the cathode (also apparently coming from chemical attack) this suggests that Zn depletion on the cathode surface requires some time to develop. Assuming this to be the case, a strong argument can be made that thermally induced Zn evaporation may be occurring at the cathode surface.

In general, brass alloys outperform pure metals as chamber cathodes. It is not completely clear why brass erodes so slowly as a cathode in fluorine gas discharge laser chambers, however applicants believe that the reactivity of Zn with $F_2$ gas (forming $ZnF_2$ solids) may help slow cathode erosion. Theoretically, the ideal cathode material would consist of: 1) a single compositional element, 2) a single crystalline phase, 3) a low sputter yield element, 4) a large grain size, 5) a low vapor pressure, 6) low metallic and dissolved gas impurities, 7) the generation of solid reaction bi-products when corroded by ionized fluorine gas.

As metals go, Cu and Ni appear to almost fit this profile, however neither forms an entirely successful cathode. Pure Cu appears to pit, and consequently not be anode "friendly," and Ni wears relatively very fast, though both also have alloys that demonstrate some of the above positive traits of a cathode. As predicted, Cu wears slowly as a cathode, however pitting appears to be tied to Zn content. Therefore, pure copper is not a reasonable cathode material since it increases anode wear rates. Zn additions to Cu (brass alloys) reduce the melting temperature of the alloy, perhaps allowing some surface material reflow to cover up pit-like defects. Zn is very reactive with Fluorine, and therefore it may also play a more chemical role in cathode pit suppression. Ni, on the other hand, wears smoothly as predicted (i.e., is anode "friendly"), but faster than is desirable. This may be due to the poor reactivity of Ni with Fluorine gas. Ni does not pit as a cathode material, suggesting that cathode pitting is not related to surface chemistry effects (i.e., Zn is not needed to suppress pitting). Perhaps it may not be possible to find a material with all of the above traits. Brass is inexpensive, and wears at a consistent and predictable rate as a cathode, and appears not to pit in the case where the content of the Zn is >20% (percent by weight).

Brass cathode pitting can be tuned by adjusting alloy Zn content. Applicants suggest that Zn additions should be held to a minimum since cathode erosion is accelerated if high Zn levels are used. Perhaps for self passivating alloys, using an alloy 5 cathode may resist cathode pitting damage better than alloy 4. In addition, Pb additions to brass cathode alloys appear to increase wear rates and cathode roughening. Pb is not uniformly distributed in brass, and has the unusual ability to prevent grain growth. The Pb is relatively uniformly distributed in the bulk brass alloy, however, by non-uniformity is meant that, since, e.g., the Pb is not very soluble in the alloy it segregates and "clumps" at grain boundaries in different regions, so that, at, e.g., 500× magnification it can be seen that the distribution is very non-uniform. Pb is also highly reactive with fluorine. Pb may accelerate cathode erosion by increasing fluorine ion surface affinity to the brass (i.e., may be struck during ringing in the discharge). Pb also pins metal grains, therefore preserving a fine grain structure. As sputter targets, fine grain materials erode faster than large grain materials since it is easier to eject atoms along grain boundaries (i.e., reduce surface energy). Since there are 2 possible mechanisms as to why Pb containing brass alloys wear faster as a cathode than non-Pb containing alloys, applicants suggest using lead free brass alloys as a long life cathode (e.g., using alloys 4 or 5 from Table 1 or a C27000 brass).

Figure 10:
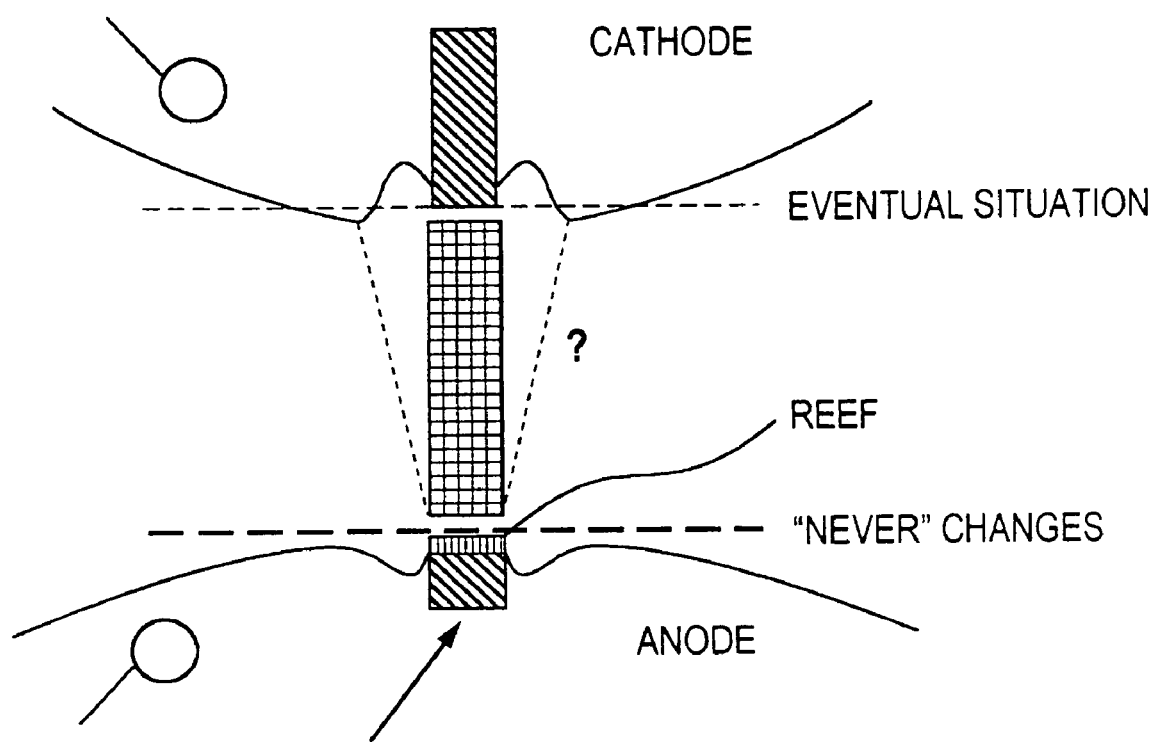
FIG. 10 shows an electrode system exemplifying differential erosion.

It is also possible that, using the above principles to find cathode materials with various wear rates, one can combine 2 different alloys with differing erosion rates to create differential erosion cathodes. A differential erosion cathode is illustrated in FIG. 10. Applicants have tried both Cu10200/alloy 4 and alloy 4/alloy 8 diffusion bonded cathodes. Both systems appear capable of exhibiting differential erosion in KHz or ArF chambers.

FIG. 10 shows an electrode system containing a cathode 20 having a main body 21 made of a first material and an insert 21 made of a second material, with the first material 21 having a higher erosion rate than the second material 24, thus eventually forming a differential erosion trench 24. It will be seen that the insert 24 eventual erodes away from the anode 22 over time as well. FIG. 10 also shows a cathode having a main body 23 made of a first material and an insert 26 made of a second material, e.g., one that will form a passivating layer (reef) 28 as an anode in a fluorine gas discharge laser. The differential erosion rates of the first and second materials, aided by the reef 28, eventually forms an erosion trench 27 on either side of the insert 25 in the anode 22.

Figure 11:
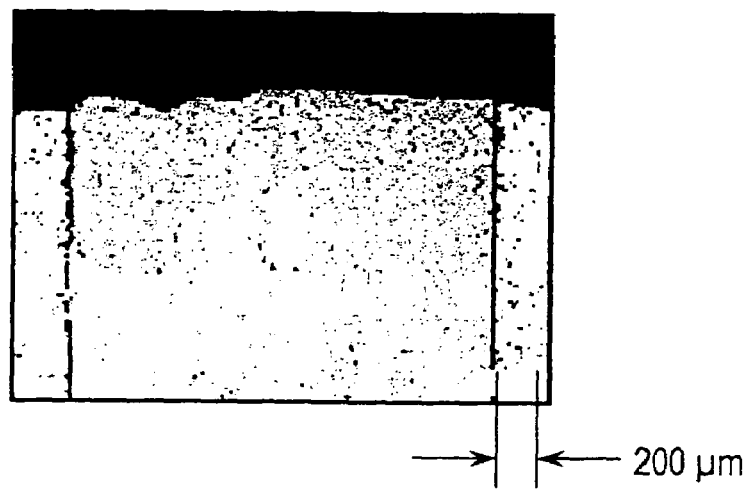
FIG. 11 shows a bonded bi-metallic cathode.

A Cu10200/alloy 4 cathode is illustrated in FIG. 11, which has been exposed to >2.5 Bp, at 4 KHz in an ArF laser chamber. One can see that a step 26 has formed on the PI tube side of the cathode, the left side as shown in FIG. 11, confirming that the alloy 4 is wearing faster than the C10200 (as predicted).

Figure 12:
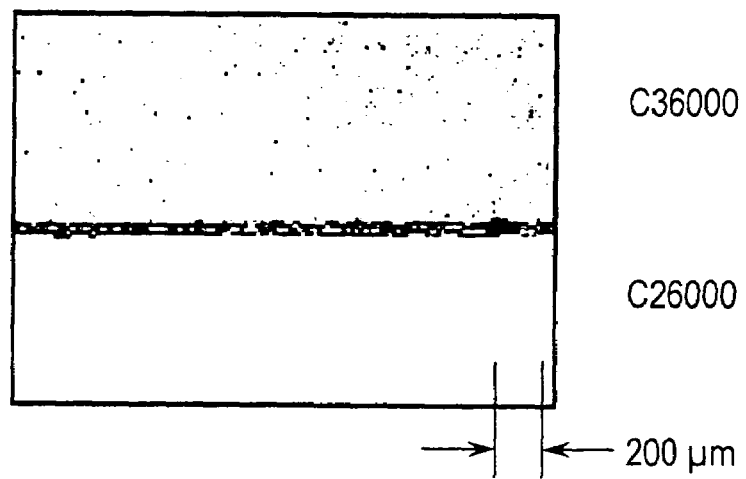
FIG. 12 illustrates a diffusion bond.

FIG. 12 illustrates an alloy 4/alloy 8 diffusion bond (Ni interlayer visible). From FIG. 12, one can see the large difference in microstructure between the annealed alloy 4 and alloy 8. Diffusion bond strength for the Cu10200/Alloy 4 process was approximately 5000 PSI. The supplier Tosoh SMD was able to achieve bond tensile strengths of greater than 16,000 PSI (40–50% Yield strength) for the alloy 4/alloy 8 system, e.g., due to using a metal intermediate layer, e.g., the Ni layer shown in FIG. 12. Applicants believe that this higher bond strength will be adequate for a chamber electrodes, e.g., cathode, applications as explained further below.

While diffusion bonding is common in some other industries, e.g., the physical vapor deposition ("PVD"), i.e., sputtering, target industry, applicants are not aware that it has been used for the formation of multi-material, or the like, electrodes, and specifically not for fluorine gas discharge electrodes, and further specifically not for bimetallic electrodes that better maintain shape over life and/or for differentially eroding structures. More specifically, applicants are not aware that such alloys as alloys of brass, e.g., C36000 and C26000 had been diffusion bonded before applicants suggested this be done, and more specifically be done for electrodes, and specifically for electrodes in a fluorine gas discharge laser environment.

Applicants company approached the above referenced vendor, Tosho SMD, of Grove City, Ohio to fabricate electrodes of the type variously referenced in the present application utilizing diffusion bonding. The vendor first created several prototypes, first using a typical Al to Ti diffusion bonding process. The vendor proposed utilizing a then known technique for increasing tensile strength in the bonded materials while otherwise preserving and even enhancing the structure of the bonded material and also preserving the required alloy microstructures of the bonded materials. The vendor proposed forming an intermediate adhesion metal layer between the metal being bonded. This layer may be formed, e.g., by coating each of the materials to be bonded at the bond interface, which are thereafter subjected to the diffusion bonding process. The surfaces of the respective materials at the diffusion bond interface may be roughened prior to such coating and the coating may be done by a number of thin film or thick film coating techniques well know in the art. This process is quite common for joining materials, as discussed in T. Nguyen, "Diffusion bonding—an advanced material process for aerospace technology", Aerojet, Sacramento, Calif., http://www.vacets.org/vtic97/ttnguyen.htm.

The resultant bimetallic electrode exhibits bond strengths over other well known bonding techniques on the order of some 4×, while at the same time preserving required alloy microstructures and other properties essential to proper performance as electrodes in a fluorine gas discharge laser environment. The vendor proposed a Ni adhesion layer coating, which has proved particularly successful in achieving results that are desirable, e.g., for electrode applications for fluorine gas discharge lasers. Applicants also believe that this technique of bonding can be employed in making electrodes for the next generation laser lithography light sources, e.g., EUV electrodes, e.g., as platform or, e.g., Cu or Ni to which is bonded a hollow, e.g., generally cylindrical Wolfram ("W") or Wolfram-Thorium alloy ("W—Th") EUV source, e.g., for a plasma focus source.

This has proven effective for the manufacture of multi-metallic structures of different brass alloys and relatively pure Cu and a brass alloy.

Figure 13:
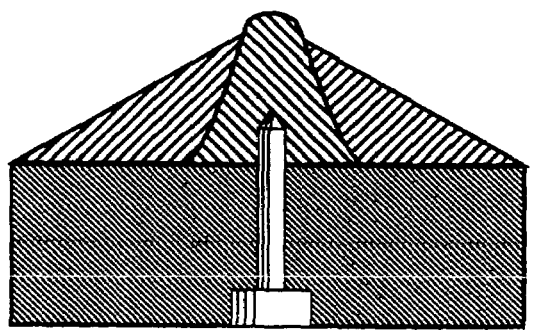
FIG. 13 shows a prior art example of an anode.

FIG. 13 shows a prior art example of an anode 80, having an anode blade 82, made of a metal in roughly a blunted blade shape, having a front side (in the direction from which laser gas is moved past the anode 80) with a front side fairing 84 and a rear side fairing 86. Each of the front and rear side fairings is made, e.g., of a ceramic insulator. The entire assembly is mounted on an anode mount 88.

Based on electrode erosion data, one can determine the etch rate ratios between the lower wearing center element and the high wear rate outer material in a differential erosion cathode. In general, one would like to select a material for the outer part of the cathode that wears faster than the center. Care also must be taken to select a center material that does not pit the cathode. Applicants have found that edge to center ("E:C") erosion ration (so-called "selectivity" of erosion) etch rate ratio of 1.17 is able to develop into a differential erosion cathode, i.e., the material in the center eroding more slowly. One can do better with Copper based alloys, however, by combining alloy 4 from Table 1 and alloy 8 from Table 1 an E:C etch rate ratio of 1.6 attainable. The optimum, anode "friendly," combination of materials would seem to be Ni201 and C26000, with an E:C ratio of >5.8. It is not clear what the optimum ratio is for E:C etch rates, however at this time applicants feel that the higher the ratio, the better. One possible choice is combining C26000 and C36000 for a low risk differential erosion cathode.

TABLE 2

Erosion Rate Ratios for Proposed Differential-Erosion Cathodes

Differential Erosion Cathodes

| Center | Edge | Selectivity (E:C) | |
|--------|--------|-------------|------------------------|
| C10200 | C26000 | 1.175438596 | Demonstrated to 2.6 Bp. Known to pit |
| C26000 | C36000 | 1.625 | Tested > 11 Bp |
| C22000 | C36000 | 1.857142857 | Ideal full brass (may pit) |
| C26000 | Ni201 | 5.875 | Best, Safe |
| C22000 | Ni201 | 6.714285714 | Best overall |

From the above, applicants have concluded that Cu—Zn cathode alloys erode at about 0.05 mm per billion pulses in ArF chambers, ArF anode materials (C26000 typical) typically erode at 0.15 mm/Bp. Cathode erosion rates in KrF chambers are about 20% higher than ArF chambers for some materials. Cathode wear rates seem to scale linearly with chamber repetition rates. Zn additions to Cu suppress cathode pitting while slightly increasing cathode erosion rates. Ni alloys are very anode "friendly," however wear much faster than Cu alloys as a chamber cathode. Anode roughening or reef (self-passivation) formation accelerates cathode wear. Pb addition can increase cathode wear rates, and is not recommended for long life cathode centers. Cathode pitting appears to increase anode wear rates. Alloy 4 from Table 1 is a good overall cathode material for ArF and potentially KrF chambers. Differential erosion cathodes appear to work well for both KrF and ArF applications. Differential erosion cathodes appear to work well with systems with E:C etch rate ratios >1.15. Differential erosion cathodes will likely work well for the long life KrF chamber applications, with proper alloy selection. In general, using alloy 4 instead of alloy 8 is suggested for improving KrF cathode life.

The present application contemplates a number of utilizations of alloy and composite alloy uses for electrodes and specifically for differential erosion rate materials, to control, e.g., electrode shapes after wear, rates of wear, etc. These include the following. Applicants' propose the use of high Zn, high Zn alloys, pure aluminum or high Sn alloys, in conjunction with, e.g., bonded, e.g., by diffusion bonding, to high Cu alloys, e.g., with greater than 80 percent Cu. The former high Zn, Zn alloy, Al and high Sn alloys erode relatively quickly and form with the higher Cu alloys preselected and beneficial wear over the life of the electrode. It will be understood that these and like differential wear patterns discussed in the application can be self-regulating. That is, as the higher erosion rate material, e.g., on either side of a lower erosion rate material erodes to form a depression on one or both sides of the lower erosion rate material, the discharge will become more focused on the protruding lower erosion rate material, which will then erode at a faster rate until erosion in the higher erosion rate material on the side or sides of the central portion begins to differentially erode again.

The present application contemplates the use of a cladding process to clad pure Cu to a self passivating alloy. Applicants have determined that copper, e.g., pure copper will wear faster than any self-passivating electrode.

Figure 15:
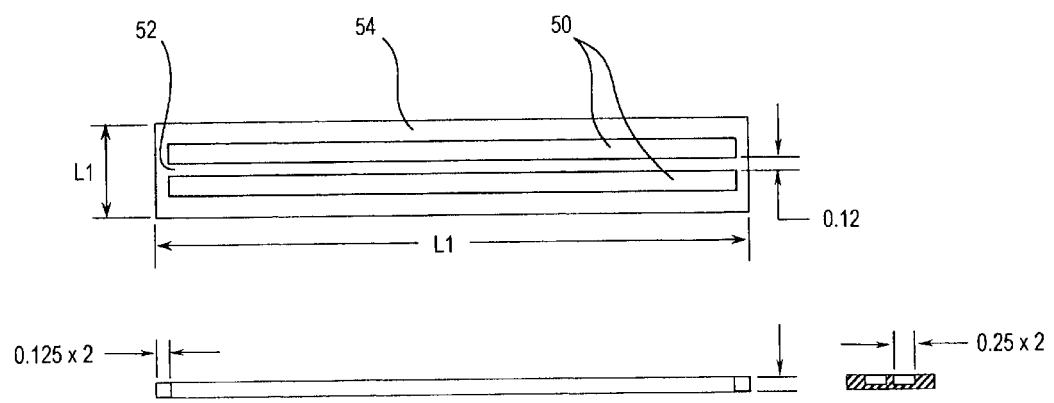
FIG. 15 shows a possible electrode configuration.

It is also possible, as is shown in FIG. 15 to create a shallow trench 50, e.g., of about 0.5 inches in maximum depth, on either side of, e.g., the crown 52 of an electrode 54, which may, e.g., be of the same material as the rest of the body of the electrode 54, and to fill the trench 50, e.g., with, e.g., zinc, e.g., in the form of zinc alloy or pure zinc, e.g., in molten form. Thereafter, after the zinc/zinc alloy cools the assembly can be machined to form the desired shape, e.g., with the crown 52 similar to the blade 82 in FIG. 13, with the trench 52 and remainder of the electrode 54 replacing the fairings 84.86 shown in FIG. 13. Alternatively there may be formed the cross-section of FIG. 11, with the crown 52 in the position of the insert shown in FIG. 11. Indium or alloys or pure indium can similarly be used in replacement for the zinc for making anodes.

It is also possible to leave the just-mentioned trenches empty to contain the discharge on the portion of the electrode on the crown 52 between the trenches. This could also be done with multiple trenches flanking respective multiple extending discharge receptor protrusions in the nature of multiple crowns 52. Materials, e.g., spray coatings or electroless coatings of, e.g., pure Ni, Ni alloys, e.g., Ni—Cu alloys, Sn or Zn or their alloys may also be deposited in such trenches 50, e.g., by spraying, thus flanking the electrode crown 52, and then machining the whole into a final shape. A Damascene process may be used in this instance. A Damascene process, e.g., may involve the deposition of a material on a relatively rough surface and the polishing down of the high points to give an inlaid finish.

Another material that can be used to flank, e.g., a discharge crown could be gildcop, an alumina doped copper material useable as a high erosion rate material.

Figure 19:
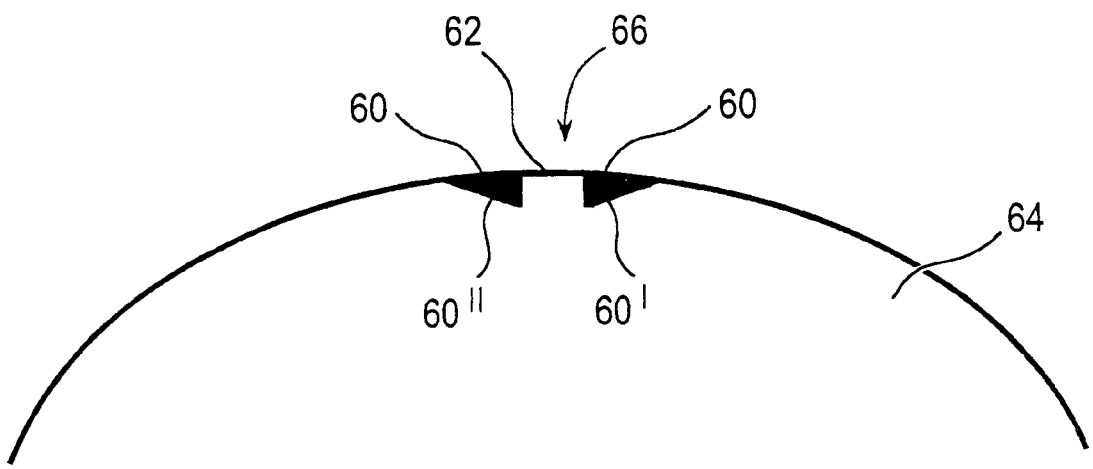
FIG. 19 illustrates another cathode.

As shown in FIG. 19, applicants have also developed another form of what might be called a "solder sidewalk" or alloy sidewalk cathode in which the trenches 50 as shown in FIG. 15 may be replaced with rotated "V" shaped slots 60 in which the one side 60' of the "V" lies in essentially the vertical plane and the other side 60" lies at an angle to the horizontal. The respective one sides 60' of the respective "V"'s 60 together form the side walls of a crown portion 62 of the electrode, e.g., a cathode 64. The rotated "V"'s may be filled with a suitable faster eroding material than that of the cathode 64, e.g., a material containing Pb, e.g., a Pb solder, while the cathode 64 may be made, e.g., of oxygen free copper ("OFC") copper, e.g., annealed to obtain a maximum or nearly maximum grain size, as such annealing is known in the art. The "sidewalks" formed by the "V"'s may be formed by placing the material for the sidewalks, e.g., the Pb solder in the rotated "V"'s in molten form or melting it into the "V"'s, allowing it to harden and then machining it down to the contour of the cathode 64.

In the course of fabricating some of the electrodes discussed in the present application above various elements could be, e.g., fabricated separately and joined by various means, including, e.g., bolting, cladding or bonding, e.g., diffusion bonding, and perhaps then could be machined or further machined to form the desired end product shape. Bonding processes may include various ways of forming composite materials, e.g., single piece electrodes formed by diffusion bonding, explosion bonding, cladding, ultrasonic welding, friction welding, galvanizing and the like.

An upper surface of an electrode containing high content of a particular material, e.g., Zn, may be formed, e.g., by annealing, e.g., certain high Zn content brasses, e.g., alloy 4, C27000 or alloy 8, e.g., at temperatures of 1200° F., e.g., for 60 minutes, e.g., per inch of thickness. Applicants have found that thereby relatively thick layers of relatively pure Zn, e.g., of between 0.005 and 0.010 inches are formed. Applicants refer to this as, e.g., a Zn oxidation process, which segregates the Zn to the surface of the zinc-containing alloy. Zn, having a high affinity for oxygen readily segregates to the surface forming $ZnO_2$ at the surface.

One form of passivation layer/reefing engineering that applicants have discovered makes use of processes such as those utilized in the manufacture of tin nanowires using a vacuum infiltrated porous anodization of aluminum. Such techniques can enable the creation of a synthetically created reef layer made of, e.g. a metal fluoride, on an electrode created with relatively controlled pore size and distribution, having such properties as a controlled and evenly distributed porosity, e.g., as an anode reefing layer. In this manner the barrier reef may be engineered for controlled chemical and electrical properties, e.g., impedance, e.g., to control the surface charge on the reef to, e.g., avoid arcing, and in this manner optimize corrosion/erosion resistance and optimize impedance.

Utilizing such a technique can enable the growing of self-passivation material in relatively columnar and relatively evenly distributed structures, resembling, e.g., in one embodiment an orchard of tree trunks and in another a honeycomb with generally circular openings and a surrounding latticework structure. This relatively evenly distributed orchard of tree trunks/laticework develops naturally through the mechanism of the anodization process and the resultant tree trunks/laticework can be employed to limit the transmission of, e.g., charged ions present in the laser gas discharge, through the openings to the electrode surface while maintaining the electrical conductivity, though the "tree trunks" themselves, as oxides, are insulative. This same mechanism of blocking ion transport can be employed in the anodization process as to the reactants to control the growth and separation of the "tree trunks"/holes in the latticework.

Figure 14:
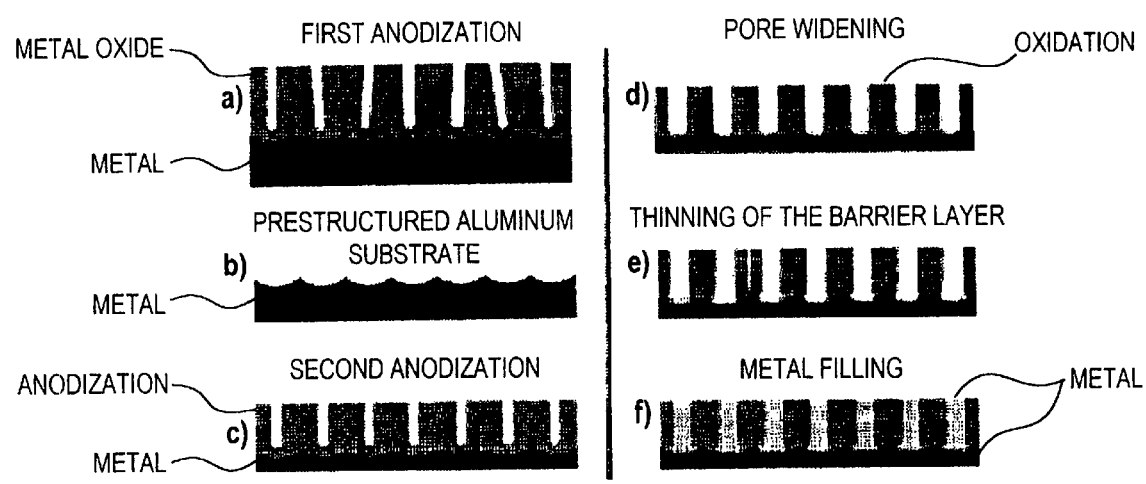
FIGS. 14a–f illustrate an exemplary artificial reefing process.

The uniformity of the growth and separation of the "tree trunks" may be enhanced and its control made more uniform by, e.g., pre-texturing the alloy surface on which the artificially engineered reef is to be grown. This can be done, e.g., as shown in FIGS. 14a–f. In FIG. 14a there is shown a substrate 30, which may be the surface of an electrode. The surface 30 of the electrode is shown in FIG. 14b to have been grown a first anodization 32, which contains a plurality of relatively evenly distributed "tree trunks" 34 and pores 36.

In FIG. 14b there is shown that after removal of the first anodization 32 the surface of 30 is left textured. This step is then followed, as shown in FIG. 14c, with a second anodization 32', which as is shown results in a more uniformly distributed set of tree trunks 34' and pores 36,' and also with the vertical orientation of the pores 36' being more uniform. The formulation in FIG. 14c may be useful in its own right as an artificial reef coating on the surface of, e.g., an electrode. It may also be further enhanced for desired results by, e.g., as shown in FIG. 14d, widening, e.g., the pores, e.g., by an etching process. This may also be followed by or include, as shown in FIG. 14e a thinning or removal of the barrier layer 40 at the bottom of the pores 36' and subsequently filling the pores 36' with a conductive material, e.g., metal 42. This process may be implemented in-situ in an operating laser chamber, e.g., by reversing electrode polarities in the step of removing the first reef.

Oxides other than aluminum oxide, e.g., ZnO, $SnO_2$ and PbO, which are semiconductors in nature, but mostly insulative and have a relatively lower sputtering erosion rate than pure metals or metal alloys can be used, e.g., on the anode, to resist fluorine attack, without also adversely impacting impedance. This is proposed by applicants as a substitute to the naturally growing reefing, which applicants have found can have adverse impacts on, e.g., system impedance, e.g., at higher gas discharge pulse repetition rates, e.g., over 2000 Hz.

As opposed to forming an insulator and metallically doping the layer or mechanically or ionically drilling holes in the layer on, e.g., an anode, applicants propose to grown an oxide layer over the surface of an electrode formed of the material which also forms the oxide, in pure form or alloy form, to create the oxide layer. Some such materials in the pure form may not be suitable for use as an electrode, e.g., pure Zn or Pb, due to other reasons, e.g., mechanical strength. However, for some alloys, e.g., CuZn, e.g., subjected to oxidation in, e.g., a furnace oxidation process, an ozone oxidation process, a plasma immersion ion implantation oxidation process, an $O_2$ plasma surface treatment oxidation process or by annealing in an oxygen atmosphere, or the like process, the ZnO will grow faster than the CuO or $CuO_2$. The ZnO is also a more stable molecule. Also, due to the thin film nature of the growth, the layer of ZnO and CuO or $CuO_2$ will be very dense and protect the electrode surface from erosion, e.g., due to fluorine attack, e.g., due to sputtering under fluorine ion bombardment, and at the same time not impact impedance significantly. Normally such a thin film oxide, e.g. $SiO_2$ is an insulator, e.g., in integrated circuit manufacture, but not at the thickness involved in the present application and at the voltages across the electrodes in a gas discharge laser as discussed in this application.

Surface texturing may also be applied by, e.g., grit blasting the electrode surface. This may be, e.g., a substitute for the first anodization step shown in FIGS. 14a and b.

Differential erosion electrodes, containing, e.g., low erosion material on the crown of the electrode, generally where the discharge region will mostly be, and higher wear rate material flanking the lower wear rate material on the crown, in order to maintain an electrode shape profile in the discharge region may be formed, as has been demonstrated by applicants in, e.g., 2 KHz ArF and KrF laser chambers, considerations of such other properties of the electrodes, e.g., thermal properties, e.g., heat transfer coefficients and profiles may also be taken into account.

Diffusion bonding and other ways to avoid, e.g., solder joints may also attribute to the proper and adequate fabrication of such bimetallic or tri-metallic electrode bodies, achieving, e.g., with diffusion bonding multi-metallic structures that are formed with dense, high strength bonds with excellent thermal conductivity. The bonding process, e.g., diffusion bonding, e.g., utilizing an intermediate very thin third metal, e.g., Ni, layer, as shown in FIGS. 11 and 12 can be utilized to engineer the profile of the multi-metallic electrode structure to alter thermal and/or chemical properties of the electrode body. As shown, e.g., in FIGS. 16*a–d*, electrodes may be engineered to, e.g., modify the heat transfer through the electrode, e.g., to its electrode mount, in order to, e.g., modify the thermal interaction between the electrode and its electrode mount, e.g., to prevent cracking of the mount, which may often be a relatively brittle ceramic material subject to its own interior thermal stresses and to the, e.g., bending of the metal electrode induced by temperature changes and/or of the gas discharge laser chamber under pressure.

Figure 16:
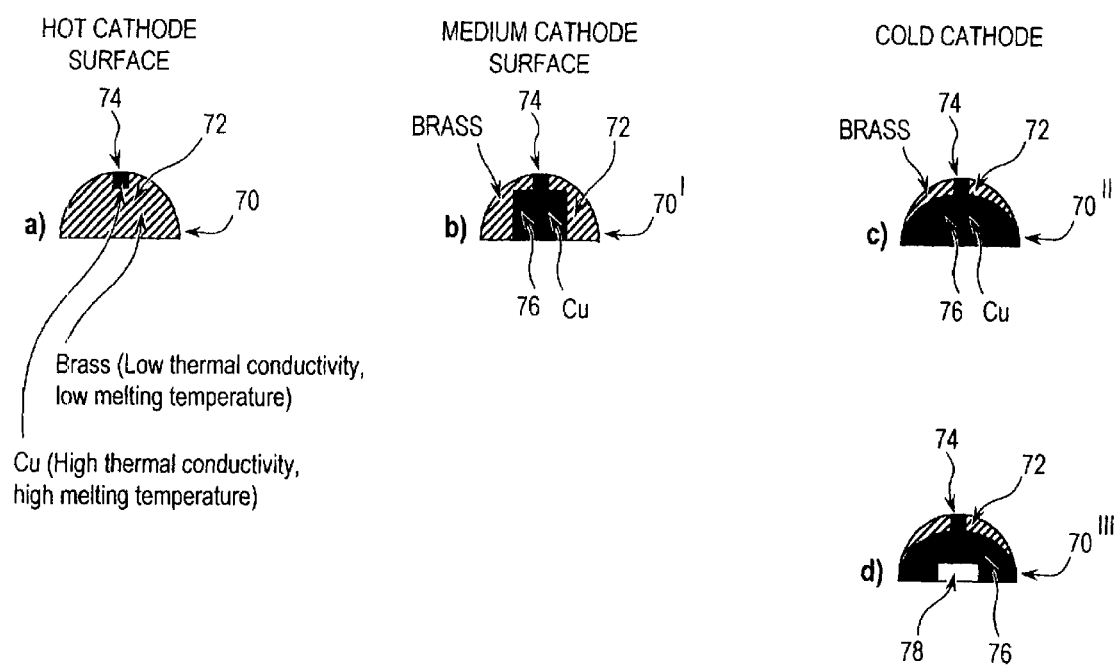
FIGS. 16a–c show multi-metallic electrodes having improved and tunable thermal conductivity properties.

FIG. 16*a* shows a relatively "hot" electrode 70, e.g., a cathode, which is formed from a body 72 comprising a material, e.g., brass, with a relatively low thermal conductivity and a relatively low melting temperature, diffusion bonded with an insert 74, of a material, e.g., Cu, having a relatively high thermal conductivity and a relatively high melting point. FIG. 16*b* shows a "medium temperature electrode 70', e.g., a cathode, comprising a body 72 and an insert 74, forming the crown of the electrode, along with an additional insert 76. The body 72 may be formed of a material with a relatively low thermal conductivity and melting point and the inserts 74, 76 may be formed of a material having a relatively high thermal conductivity. The second insert 76 may serve to carry more thermal energy away from the insert 74 and the body 72 of the electrode and to focus the thermal energy flux more at the boundary of the insert 76 and the electrode mount (not shown). FIG. 16*c* shows a relatively "cold" electrode 70" in which the expanse of the second insert 76 is such as to leave only a shell of the electrode body 72 formed of the low thermal conductivity and low melting point material and to leave much of the cross-section of the electrode 70" formed of the relatively higher thermal conductivity and melting point material 76. FIG. 16*d* shows another embodiment of the "cold" electrode 70''' in which another insert 78 is contained within the insert 76 as shown in FIG. 16*c* composed of a material that is of a relatively low thermal conductivity and relatively low melting point, e.g., a brass, which may or may not be the same as the brass in the portion 72 of the electrode 70 body, and may be positioned to engineer the thermal interaction between the electrode 70''' and, e.g., current feed through/mounting bolts, which may be attached to the electrode 70''' along its longitudinal extension in the region of the additional insert 78.

In the manner described above, the thermal profile of an electrodes 70—70''' and, e.g., its interaction with such elements as its ceramic mount and metallic feed-throughs, along with the thermal interaction of the electrode and feed through assembly and the ceramic mount/insulator may be better engineered. It will be understood that various utilizations of the bonding techniques discussed in this application, e.g., diffusion bonding, facilitates the fabrication of these multi-segmented electrodes and, as discussed, tuning their thermal properties. However, this particular embodiment f the present invention may also utilize simpler mechanical bonding, e.g., bolting or screwing and achieve the benefits of the embodiment of the invention.

Figure 18:
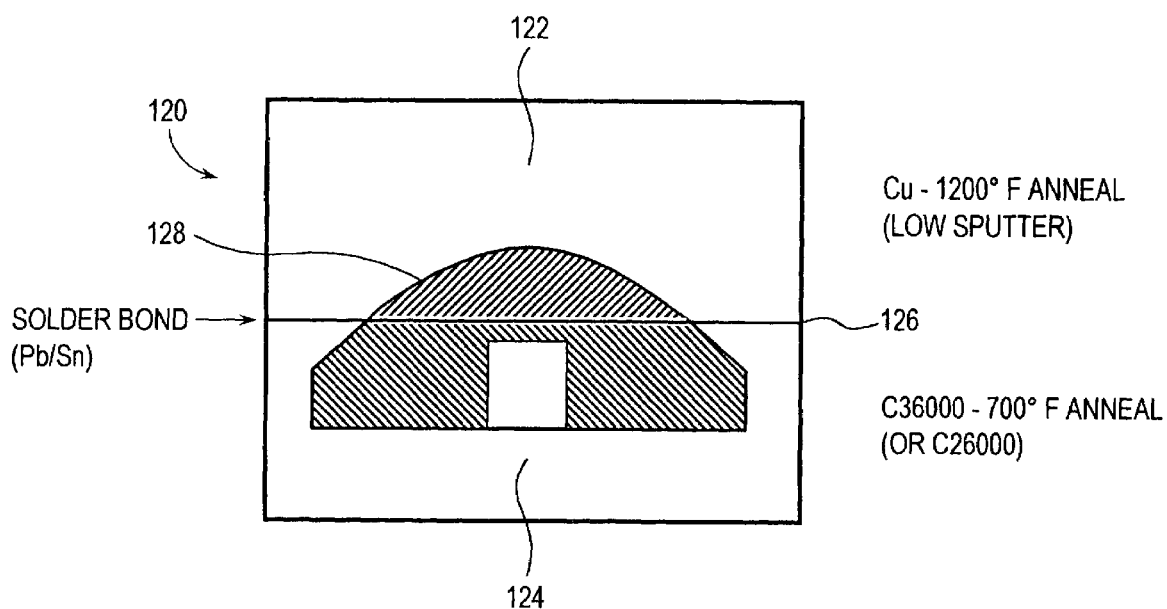
FIG. 18 shows a multi-segmented electrode.

FIG. 18 shows a cathode manufactured utilizing diffusion bonding techniques that provides for longer cathode life without modification of existing cathode size, shape or other geometries. FIG. 18 illustrates a block of material 120 which may be formed of a bar 122 of relatively very low erosion rate material, e.g., pure or essentially pure copper, e.g., annealed at 1200° F., forming a material having, e.g., a very low sputter rate material in a fluorine gas discharge laser environment. This bar 122 may be, e.g., bonded, e.g., by diffusion bonding, to a bar 124 of, e.g., brass, e.g., C26000 or C36000 or the like brass alloys, e.g., annealed at 700° F., providing, e.g., good machining and mechanical properties. The latter may be of particular importance in regard to the attachments and sealing requirements between the cathode 120 and, e.g., the main insulator in a fluorine gas discharge laser.

The two bars 122, 124 may then be bonded together by a variety of bonding techniques as noted above, giving, essentially molecular type bonds, e.g., diffusion bonding, as described above, and which may also be, e.g., further enhanced by putting a thin layer of bonding catalyst, e.g., a metal adhesion layer, e.g., Ni to facilitate an even smoother and tighter diffusion bond 126.

Thereafter the electrode may be machined from the bonded bars, e.g., as the outline 128 suggests.

In this manner a bimetallic cathode can be created that structurally, thermally, mechanically and in other ways behaves as if it were monolithic, but the upper portion is very wear resistant in the fluorine gas discharge laser environment and the lover portion has many beneficial properties that a pure copper electrode would not possess. This gives a very low erosion rate electrode, e.g., a cathode, without the need for reliance on differential erosion, e.g., with an insert or crown at the discharge region.

Figure 17:
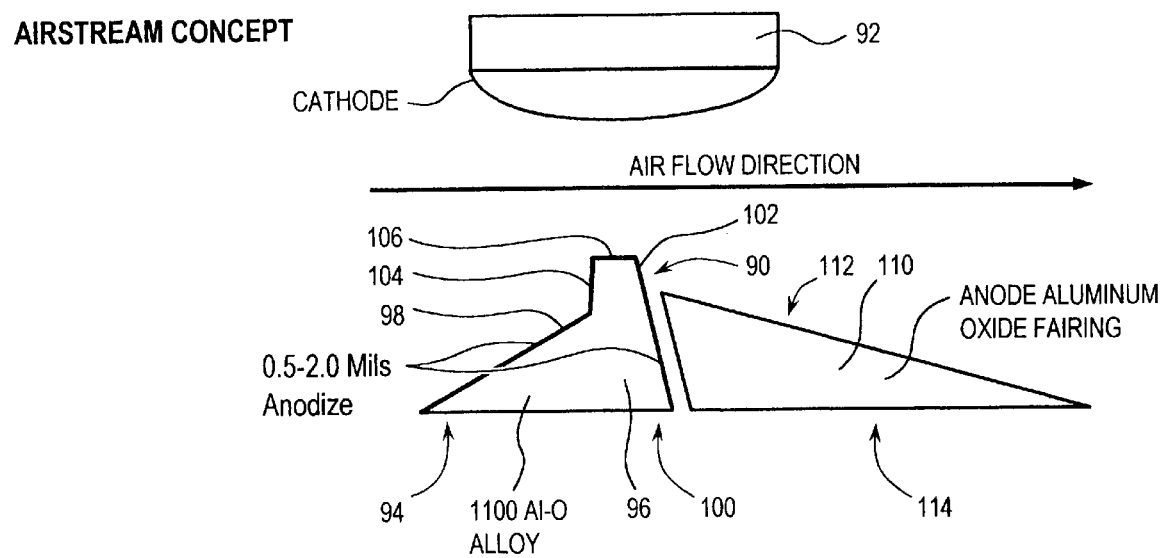
FIG. 17 shows a cross-sectional view of an electrode arrangement.

Applicants, through observation of the behaviors of anodized aluminum corrosion in fluorine gas discharge laser environments have proposed to combine anodized aluminum with, e.g., fastback fairing technology to, among other things, reduce downstream arching. An example of this can be seen in FIG. 17. FIG. 17 shows a cross-sectional view of an electrode arrangement 90, transverse to the elongated extension of the electrode pair 90, the electrode pair 90 comprising, e.g., a pair of gas discharge electrodes comprising a cathode 92 and an anode 94.

The anode 94 may comprise, e.g., a front-side (in the direction from which laser gas is moved between the electrode pair 90) including a front side fairing 96 having an upper front-side fairing longitudinally extending surface 98, extending longitudinally along the length of the anode 94. The apposing front side fairing bottom surface 100 rests, e.g., on an anode mount (not shown), attached to the interior walls of the chamber (not shown). The anode 94 may also comprise, e.g., a back side wall 102 and a front side extension 104, extending from the upper termination of the front side fairing 98. Extending between the upper extension of the front side extension 104 and the upper extension of the rear side wall 102 may be formed, e.g., a discharge region 106 of the anode 94. The discharge region 106 opposes generally the discharge region of the cathode 92, e.g., generally along the longitudinal axis of the cathode 92.

Abutting the rear side wall 102 may be, e.g., a rear side (downstream of the gas discharge laser gas flow between the electrode pair 90) having, e.g., a rear side fairing 110 having a rear side fairing upper surface 112, which may extent slightly higher along the rear side wall 102 than the intersection of the front side fairing 96 and the front side extension 104. The rear side fairing 110 may, therefore, extend laterally a longer distance than the front side fairing 96. The rear side fairing bottom surface 114 may also rest on the anode mount (not shown).

The entire anode 94 may comprise, e.g., Al. The exposed surfaces of the anode 94, including, e.g., the front side fairing upper surface 98, the front side extension 104, the discharge region 106 and the portion of the rear side wall 102 extending above the abutting rear side fairing 110 may be coated with anodization of the material of the anode 94, e.g., anodized aluminum, e.g., from about 0.5–2.0 mils thick. The thickness may be selected (tuned) for the desired combination of impedance and erosion resistance. The surface may also be roughened, e.g., with a 30–80 micro-inch Ra abrasive Al blast, e.g., air propelled sand. Grit-blasting/roughening could also be accomplished with a non-silica containing media. The anode may also be fabricated as noted above utilizing, e.g., an Al 1100-0 alloy of 99% commercial grade aluminum along with other Si free aluminum alloys.

The above-described anode may be especially useful in promoting long life in fluorine gas discharge lasers, particularly ArF fluorine gas discharge lasers. This is particularly useful in applying the combination of a blade dielectric and a monolithic anodized anode 94 with a monolithic front side fairing 98, which the applicants have named an "airstream" anode after the aerodynamic aluminum mobile homes of the mid-twentieth century. The passivated long life, e.g., anodized, pure or essentially pure aluminum anode with the "airstream" front fairing 98 combined with the rear fairing 110 of a known blade dielectric anode, e.g. as generally shown above in FIG. 13, and slightly modified according to the presently described embodiment, can have a number of beneficial effects.

It will be seen that the combination of the blade portion of the anode exemplified in FIG. 13 with the monolithic front side fairing 96 of the above described embodiment can serve to make the anode 94 easier to manufacture. This is due to the fact that pure aluminum or substantially pure aluminum is a relatively soft material and the larger monolithic cross-section gives the structure more strength to withstand the manufacturing processes, e.g., machining. Also, aluminum anodization is a very controllable process and can be tuned to optimize anode discharge behavior from an erosion standpoint and at the same time provide adequate impedance characteristics for proper discharge between the anode and the cathode. Thus can be avoided the uncertainties of naturally grown anode electrode reefs and the $F_2$ chemistry problems found to be associated with naturally grown reefs. Such tuning provides for longer life of the anode, e.g., in a fluorine gas discharge laser, e.g., an ArF gas discharge laser. Finally the just described anode is less costly overall to manufacture, and install, including cost of materials and fewer numbers of parts, than, e.g., the blade dielectric anode illustrated, e.g., in FIG. 13. A further advantage is the aerodynamics of the monolithic anode 94—front side fairing 96 combination, and the fact that leading edge modifications, e.g., for gas flow dynamics, may readily be machined without having to worry about machining a ceramic material.

Applicants have demonstrated an electrode as described with pure aluminum and a sulfuric acid anodization in a fluorine gas discharge laser, e.g., a KrF fluorine gas discharge laser at up to 2 Bp without evident damage.

Figure 20A:
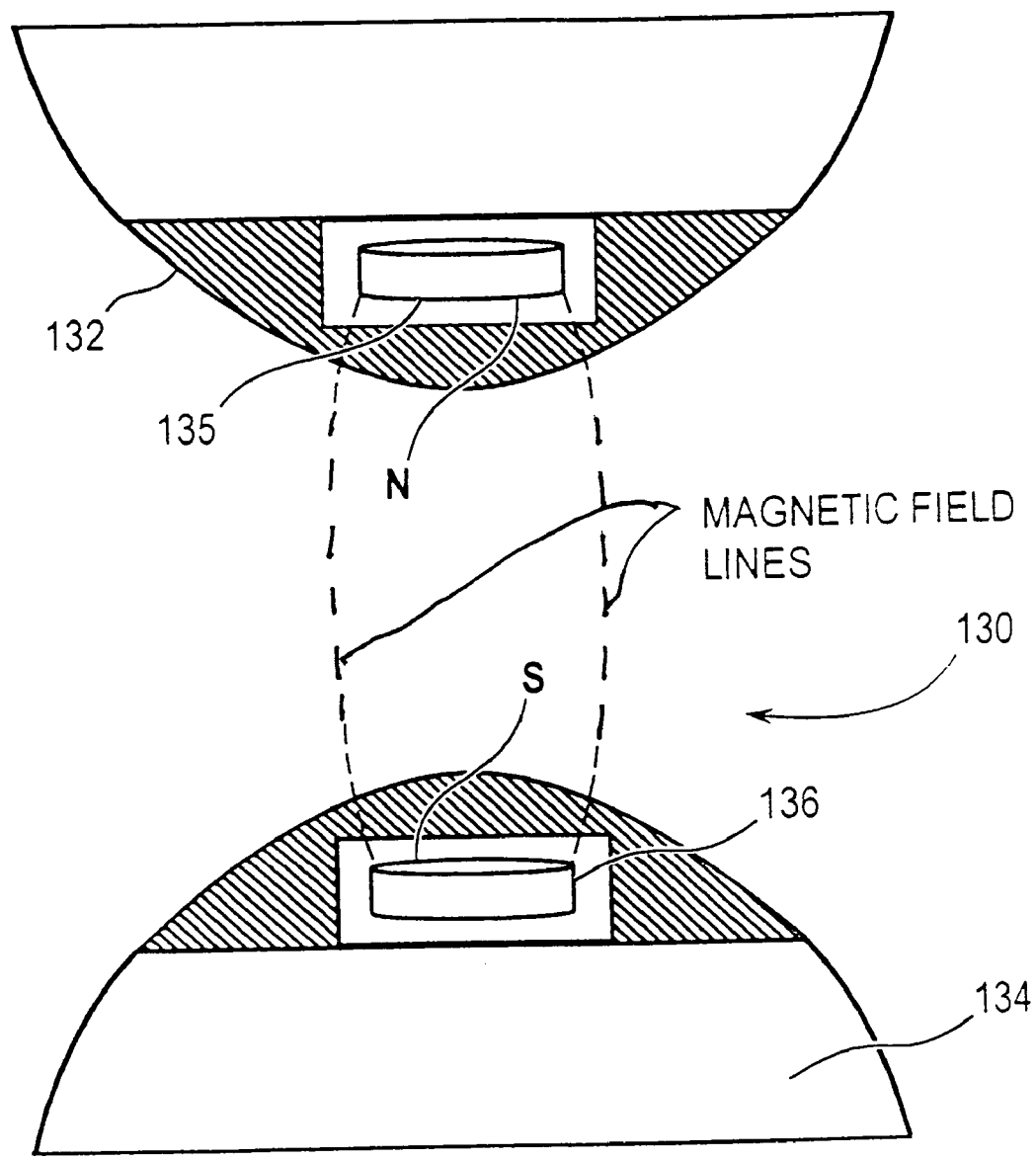
FIGS. 20a–c illustrate an anode and cathode system with improved long life discharge shape control capabilities.

An electrode system that applicants believe to be beneficial, e.g., in shaping the discharge and maintaining the shape of the discharge over electrode life comprises, e.g., an electrode system 130 as shown in FIG. 20a. FIG. 20a shows a cathode 132 and an anode 134, with the anode 134 having imbedded therein, below the discharge region a magnet 136, e.g., a rare earth magnet, e.g. which can be purchased at—, e.g. RadioShack and cathode 132 has imbedded therein below the discharge region a similar magnet 138. The north and south poles of the magnets 136, 138 are oriented oppositely so that a magnetic flux field is formed between the anode magnet 136 and the cathode magnet 138, encompassing the gas discharge 146 between the cathode 132 and the anode 134. This magnetic flux field tends to confine the discharge in the horizontal plane to tend to keep it formed more or less directly between the cathode 132 and anode 134 directly over the discharge region of the cathode 132 and anode 134 and to prevent that discharge region from spreading out laterally over chamber life. The electrons of the gas discharge and ions as well will tend to be confined within the lines of highest electric and magnetic field, so that the magnetic field boosts the confinement factor.

Figure 20B:
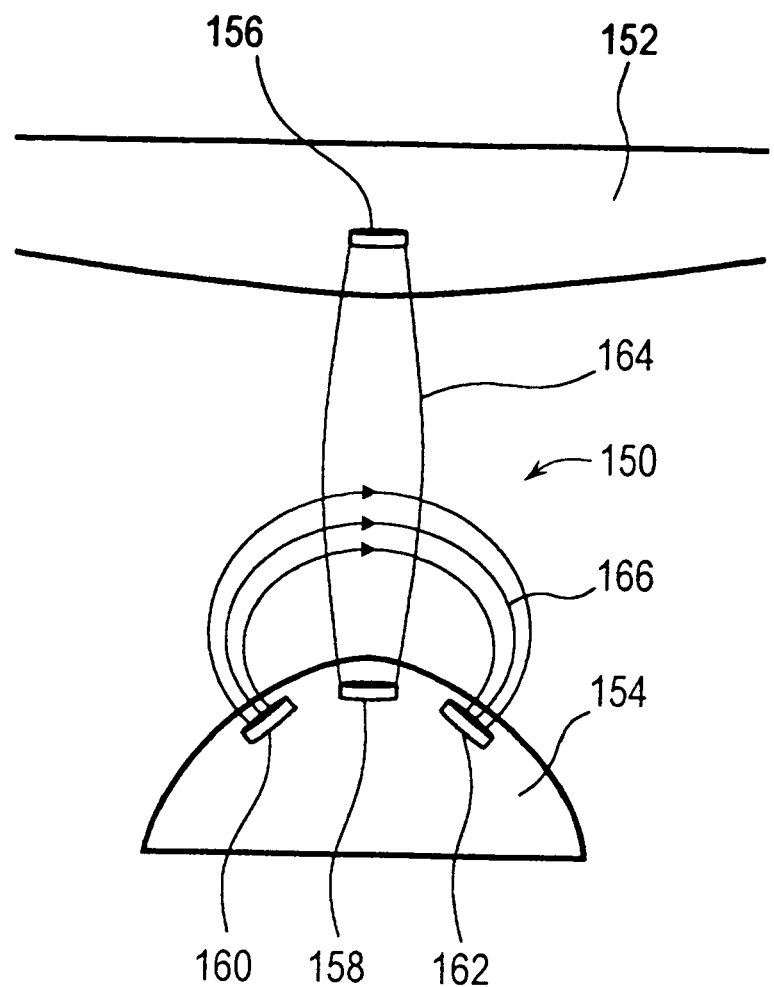

FIG. 20b shows an arrangement where the anode 154 has a pair of auxiliary magners 160 and 160 distributed on either side of the magnet 158, all of which magnets 158, 160, 162 may be rare earth magnets. The cathode 152 and the anode 154 continue to have the embedded magnets as shown in FIG. 20a, i.e., magnets 156 and 158, which serve the purposes described above in relation to FIG. 20a. The auxiliary magnets 160, 162 contained in the anode 154 serve to provide a horizontal tuning of the electric field to go along with the vertical tuning provided by the magnets 136, 138.

Figure 20C:
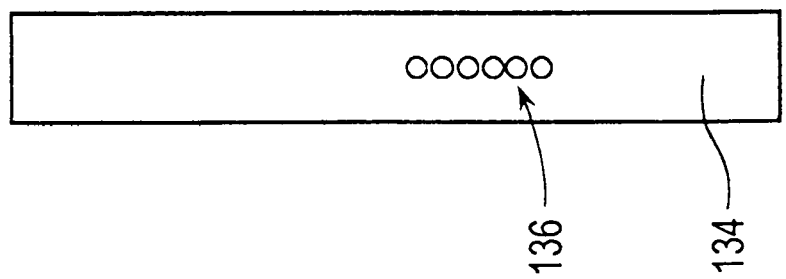

FIG. 20c shows the magnets 136 of the anode distributed generally along the longitudinal axis of the anode by way of illustration, with the same configuration being possible for the cathode magnets 138.

Figure 21A:
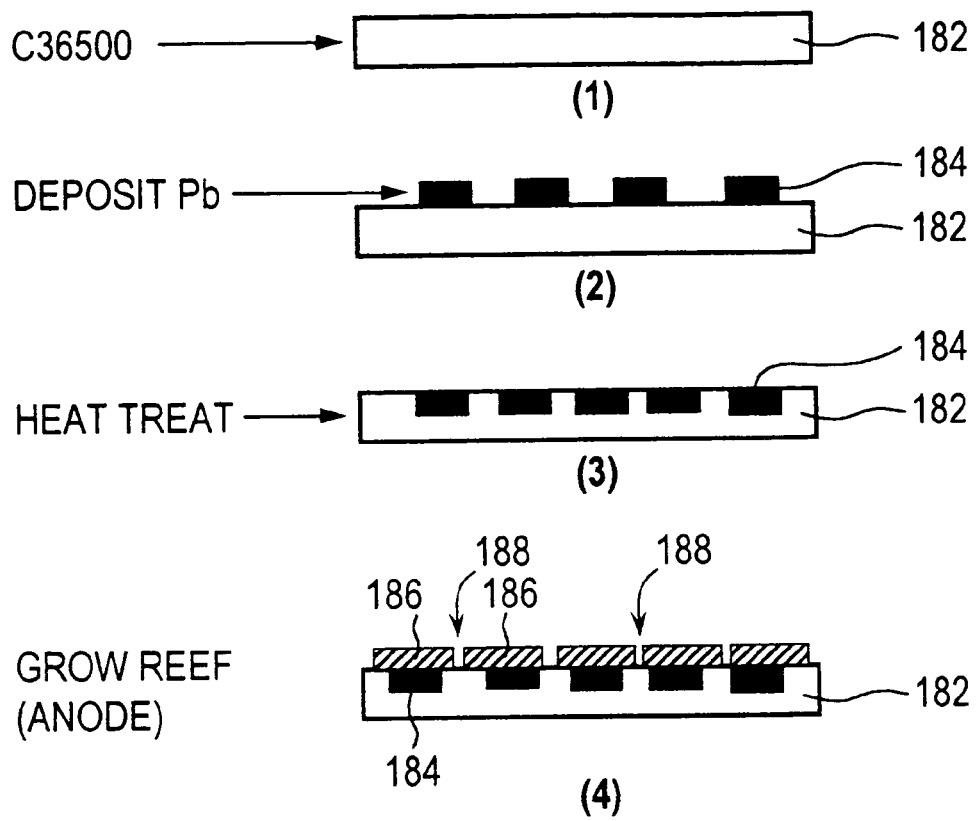
FIGS. 21a–b illustrate schematically a reef templating process.
Figure 21B:
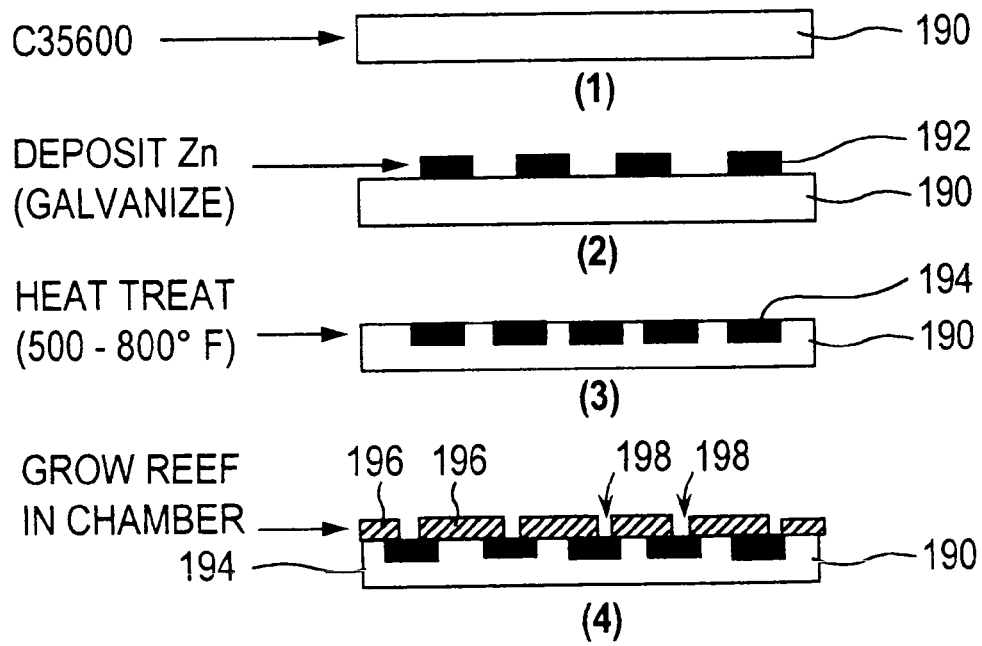

Another form of reefing engineer that applicants believe to be of great benefit in producing both long lived cathodes and anodes involves the use of so-called reefing templates. As shown, e.g., in FIG. 21a an example of a so-called positive reefing template is illustrated schematically. In a positive reefing templates system, an electrode, e.g., an anode 182 is shown schematically. The anode 182 may be, e.g., a material that does not ordinarily form a reef when used as an electrode in a fluorine gas discharge laser, e.g., as an anode in an ArF fluorine gas discharge laser, e.g., a brass alloy of copper, e.g., C36500. Having a relatively low fraction of Pb, along with a relatively high level of Zn, C36500 does not reef well as an ArF anode, as applicants have found and as can be seen, e.g., in FIG. 22. C36500 is nominally 60% Cu, 37% Zn and 3% Pb. On the upper surface of the anode, as shown in FIG. 21a2 are deposited in a predetermined pattern a plurality of deposits 184 of a material that would push the alloy of the anode 182 into the reefing portion of the curve of FIG. 22, had a corresponding reduction in the content of Zn occurred, i.e., Pb. It will be understood that many patterns for the positive reefing template are possible and may result, also along with the materials used, in reefs of differring characteristics. For example, the template could for adjoining squares in a checkerboard fashion, circles surrounded by intervening spaces, polygons surrounded by other polygons with no deposit, squares or rectangles separated by a grid of elongated straight "pathways," and the like.

Thereafter, as shown in FIG. 21a3 the Pb in the deposits 186 is diffused under thermal treatment into the upper very thin reaches of the material of the anode 182 to form diffusions 184. It will be understood by those in the art that the diffusion process will tend to alter somewhat the dimensions of the pattern formed by the deposits 184 and the shapes possibly as well, i.e., the diffusions will spread in a miniaturized version of an ink blot on a piece of relatively porous paper, which ink does at room temperature and diffusions do under high thermal stress. The remaining shape and dimensions of the diffusions 184 will, however, still allow for the reefing engineering according to an embodiment of the present invention.

As shown in FIG. 21a4 exposure of the anode 182 to, e.g., a fluorine gas discharge laser environment, e.g., in a ArF laser chamber, either during normal operations or, e.g., burn in testing during manufacturing, will now grow a reef having essentially relatively particularly placed segments 186 separated by essentially relatively particularly defined spaces 188. The placement of the reef sections 186 in relation to the respective "seed" diffusions 184, and the size of the spaces 188 have been illustrated schematically in FIG. 21a to show that the growth over the diffusions 184, as was the case with he diffusions 184 themselves, is not entirely uniform in extension away from the respective boundary of the respective diffusion 184 or on respective opposing side boundaries of a diffusion 184. Therefore separations 188 between neighboring reef regions 186 may not be uniform throughout the reef region on the anode. Applicants have also discovered that the reef regions 186 so produced are almost free of Pb, so that the Pb diffusions 184 catalyze the formation of the fluoride of the reef regions 186, e.g., CuFl, but remain in the substrate of the electrode 182 under the reef regions 186.

Nevertheless, such engineered reefs may be engineered by proper selection of deposition templates, i.e., sizes, shapes and patterns of depositions 184 and diffusion processes, for somewhat relatively uniformly forming the diffusions 184, such the reef regions 186 can be grown with their position, shape and extent on the surface of the anode 182, e.g., in the discharge region, sufficiently controlled. The extent and positioning of the reef sections 186 and spaces 188 may be sufficiently engineered to provide the insulation from, e.g., discharge and/or ion erosion and at the same time provide impedances in the required tolerances to promote long lived effective electrodes, e.g., anodes, e.g., for fluorine gas discharge lasers that are reproducible to tolerances that can be effectively manufactured.

Figure 22:
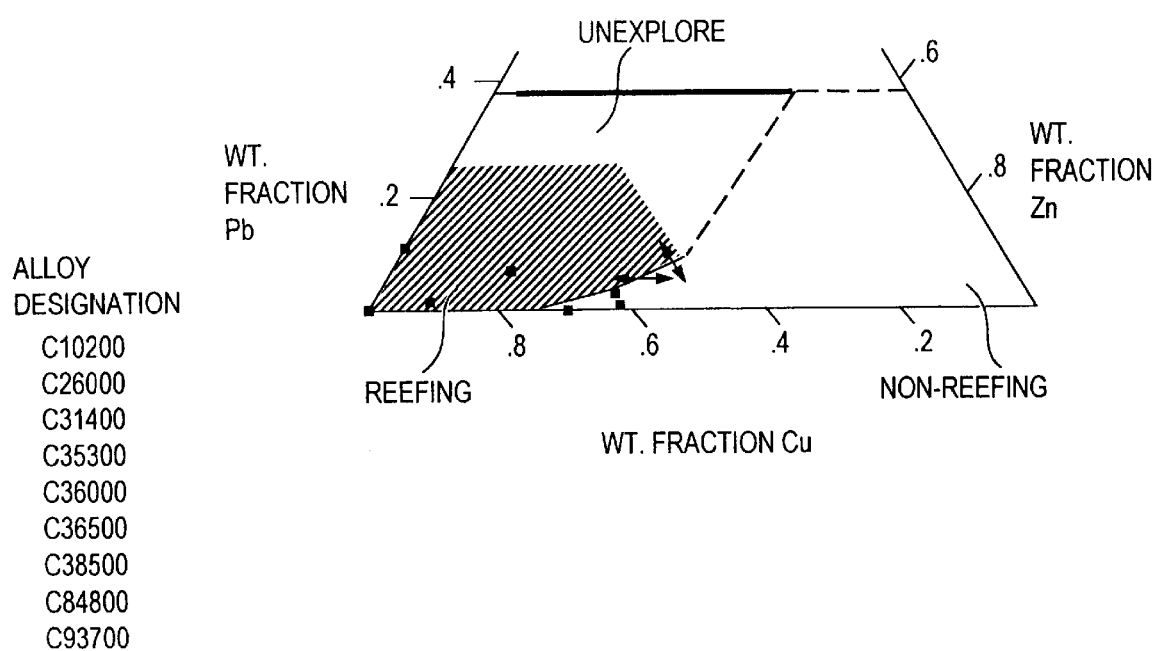
FIG. 22 shows the proportions of ally materials in brass that allow or inhibit reefing.

A similar process is illustrated schematically in FIG. 21b1–4. Here an electrode, e.g., an anode 190 comprised of, e.g., C36500, has deposited on it deposits 192 of a material that if in greater content in the alloy itself would inhibit reefing as can be seen in FIG. 22, e.g., Zn. The Zn is then diffused to form diffusions 194 and then the reef is grown having reef sections 196 and openings 198, except that now the openings 198 generally conform to the locations of the diffusions 196 as opposed to vice-versa in the process of FIG. 21a. The same issues of controllability and manageability of the reefing process as were the case described above for the "positive" reef templating process of FIG. 21a exist. Applicants believe, however, that these are not detrimental to the production, or perhaps more properly stated for reefs grown during actual fluorine gas discharge laser operation, the causation, of reefs with the desired dual characteristics of protection against erosion and allowing proper discharge, i.e., maintaining sufficiently low impedance.

Applicants also believe that the size of the grain boundaries and the number of grain boundary intersections in the material of the anode plays a part in this process, e.g., in forming interstices at grain boundary intersections into which the Pb or Zn depositions can migrate in the diffusion process. Roughly 20 micron separations of grain boundaries in at least one dimension of the grain seem to promote the processes discussed above. In addition applicants have found that a roughly 0.004 inch wide "seed" of, e.g., Pb, can promote the growth of a roughly 0.02 inch wide growth of reef.

Figure 23A:
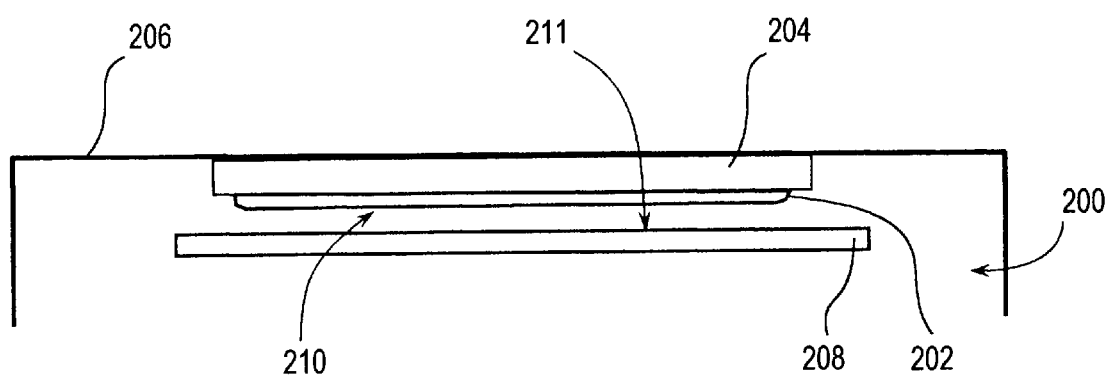
FIGS. 23a–d illustrate a bowed electrode concept.

Another aspect of electrode life that has been observed by applicants can be seen in viewing FIGS. 23a–d. FIG. 23a shows a schematic side view of a portion of a gas discharge laser chamber 200 having a cathode 202 and a main insulator 204 attached to the top 206 of the chamber 200. During operation of a gas discharge laser the chamber 200 is placed under relatively high pressure, e.g., of 3–4 atmospheres, and it is known that this causes to roof 206 to bow upward, taking the main insulator 204 and electrode (cathode) 202 with it. This is shown schematically and not to proportion, for illustrative purposes, in FIG. 23b. This bowing, while only about 0.005 inches at its peak point, can create problems in main insulator 204 cracking, which are addressed in ways not the subject of this application, but is believed to also cause electrode wear problems. Applicants have observed higher electrode wear towards the ends of the electrodes of fluorine gas discharge lasers, e.g., cathodes 202, and the facing portion of the anode 208, which will be understood may not be at the end of the anode 208, since the anode 208 may extend longitudinally longer than the cathode 202. Over time, this causes the discharge to be less compact at this end region and thus less effective, resulting in the overall discharge along the electrodes on average being less effective. This, at least in part, contributes to the need for raising the discharge voltage required across the electrodes over electrode/chamber life, in turn causing more erosion along the remainder of the electrode per unit time as chamber/electrode live increases. Problems can also result from arcing at the ends of the electrode with surrounding grounded elements other than the opposing anode, due to the expanded discharge shape, which is also undesirable.

Figure 23B:
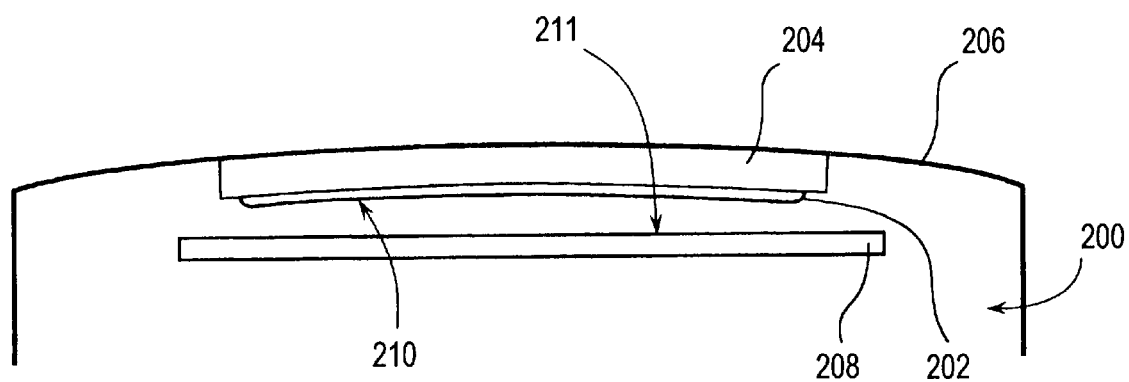
Figure 23C:
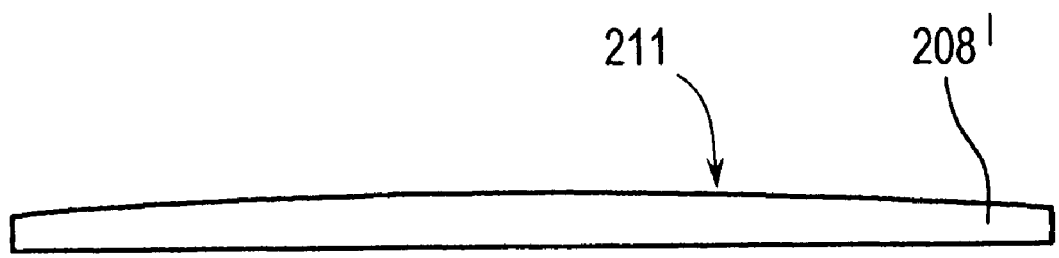
Figure 23D:
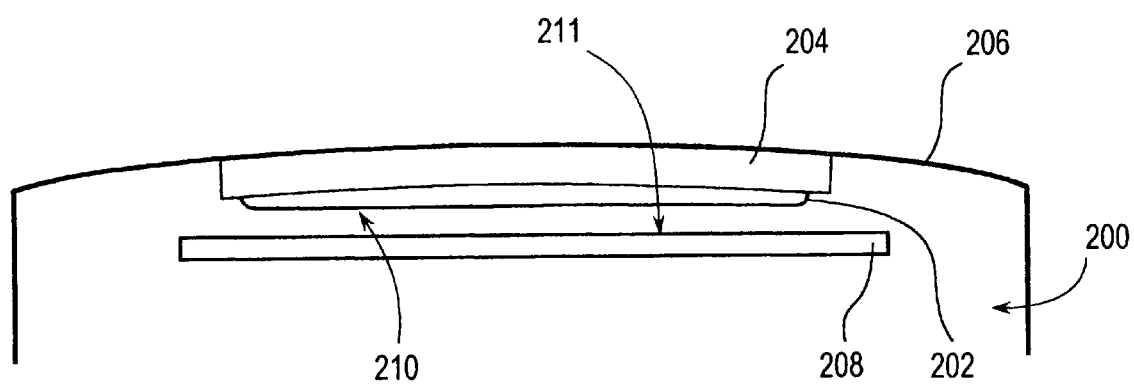

Applicants have proposed a solution to this bowing problem by the machining of a relatively equal and opposite bow in the crown region of the electrode, e.g., the anode 208', as illustrated schematically and out of proportion for illustrative purposes in FIG. 22c. Thus, when the electrode 202 and main insulator 204 bow as shown in FIG. 22b, the resultant profile of the cathode electrode 202 vis-a-vis its gap with the opposing anode 208, generally not subject to any bowing, will form a uniform gap over the entire length of the discharge regions formed on the cathode 202' and anode 208'. That is, the discharge region 210 on the cathode 202,' while bowed concavely as shown in FIG. 23b, will not have its separation from the discharge region 211 of the anode 208' varying significantly over the longitudinal length of the cathode 202 and anode 208' (any more than tolerances would have dictate had the cathode 202 not bowed as a result of the pressure in the chamber 200). Specifically the cathode 202 and anode 208' will not be relatively more separated progressing from the ends toward the middle of the anode 208' and cathode 202. Thus the anode 208', as shown in FIG. 23c is formed as a "peaked" anode. It will be understood by those skilled in the art that the cathode 202 could be machined as well with a "peak" in the center such that when the cathode 202 bows with the main insulator 204, the anode 208 will also remain relatively equidistant from the cathode 202' as shown in FIG. 23d.

Figure 24:
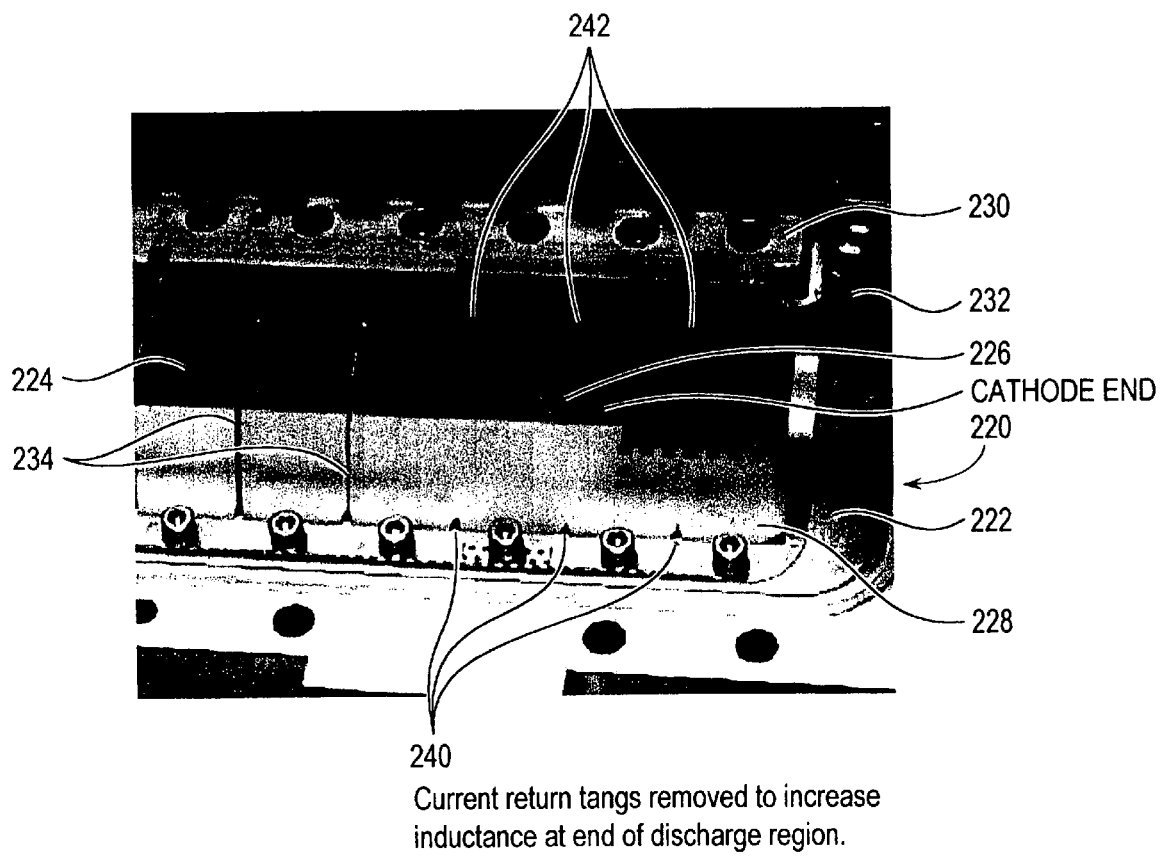
FIG. 24 illustrates a structure for reducing erosion at the ends of an electrode.

FIG. 24 shows one end of an electrode assembly 220 adapted to reduce expanded electrode erosion at the ends of the electrodes, i.e., at the end 226 of the cathode 224, and the facing region of the anode (not shown in FIG. 24.). In the embodiment shown in FIG, 24 there is also shown the anode mount 230 and the ground connection 232 of the anode mount 230 to the top half of the discharge chamber 222. In addition within the electrode assembly 220 are positioned a plurality of current return tangs 234 connected, e.g., by welding, between the chamber top half 222 and the anode mount 230.

Applicants have discovered that modifying the inductance in the region of the electrode assembly near the ends 226 of the cathode 224, e.g., lowering the inductance, e.g., by removing current return tangs 234 in this area reduces the expanded erosion at the ends 226 of the cathode 224. As shown in FIG. 24, the three tangs closest to the end 226 of the cathode 224 have been removed leaving connection stubs 240 on the top half of the chamber 222 and 242 on the anode mount 230.

Applicants have discovered that removing the tangs 234 at leas back along the cathode 224 length to beyond the region of expanded electrode end erosion reduces the end erosion effects. In FIG. 24, the connection stub 240 furthest to the left along the longitudinal length of the cathode 224 is just beyond the extent of the expanded electrode erosion along the longitudinal length of the cathode 224 and the first tang 234 is approximately_cm beyond this extend along the longitudinal length of the cathode 224.

Figure 25A:
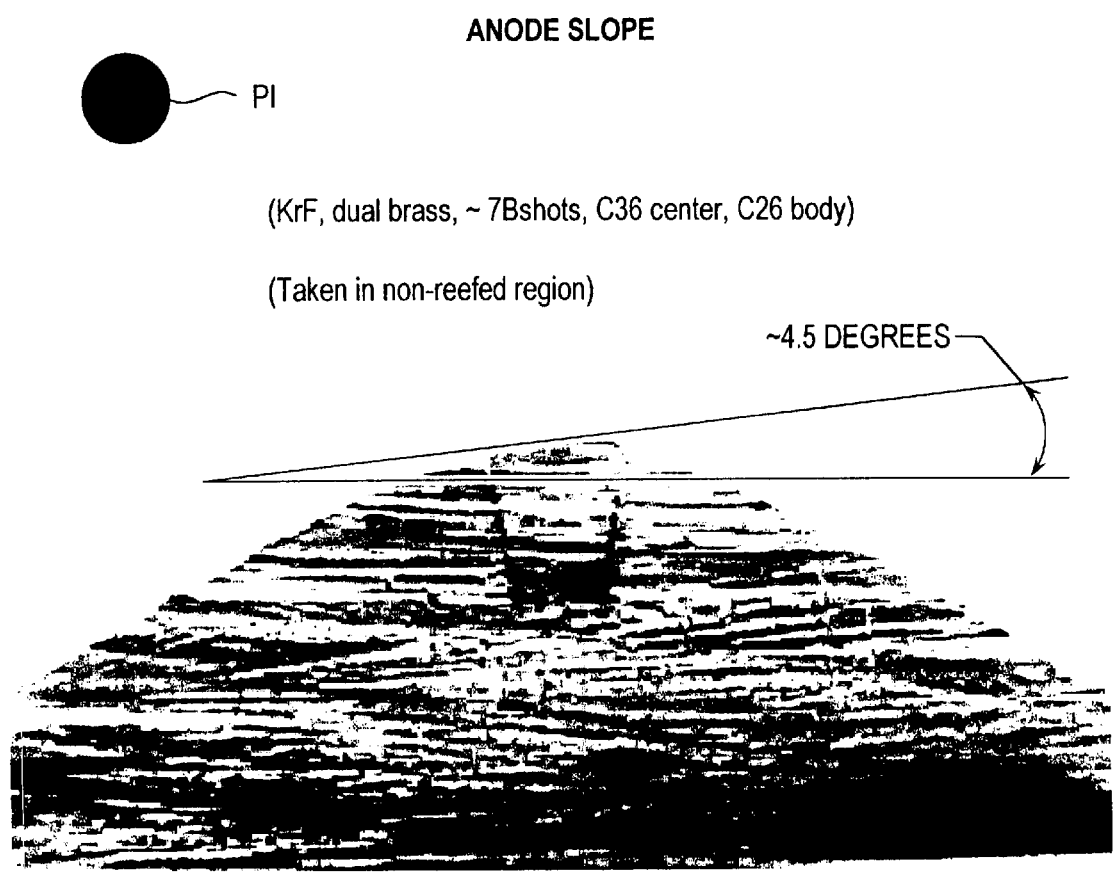
FIG. 25 illustrates a tilted crown discharge region electrode.

FIG. 25a shows a cross-sectional view of an electrode, e.g., an anode that has been exposed to gas discharged voltages producing gas discharges in, e.g., an ArF gas discharge laser. The anode 250 is shown in transverse cross section to comprise a main body 252, having contained within the main body an insert 254 in the area of the discharge region for the anode 250. The insert 254 may be, e.g., of a different material than the main body 252. The anode 250 may also comprise a front side portion 258 in the direction from which gas flow is directed over the anode and a rear side portion 260. The insert 254 may have a crown area 256 where generally the discharge is confined during fluorine gas discharge laser operation.

Then anode 250 illustrated in FIG. 25a is one which has been exposed to a large number of discharges after which applicants observed that the crown area 256, which initially was generally flat on top, had preferentially erodes on the left-most side of the crown 256 forming generally a slanted profile, slanted to the horizontal by about 4.5°.

Applicants observed that this slant is toward the side where in the particular fluorine gas discharge laser the discharges occurred is positioned a preionizing tube (not shown), as is well known in the art, which extends longitudinally generally parallel to the longitudinal length of the anode. Applicants believe that the differential erosion is due to asymmetries in the gas discharge on the side of the preionization tube due to the presence of the preionization tube and its electrical effects on the discharge, and have also observed discharge splitting in the discharge which appear to be related, at least in part, to sharp corner features and/or wear features on the electrode. Applicants have observed a similar differential wear on the cathode, though perhaps not as pronounced. applicants also believe that asymmetries in the discharge on one side of the discharge, particularly the left side as viewed in relation to the anode as shown in FIG. 25, cause or at least significantly contribute to the observed differential erosion.

Figure 25B:
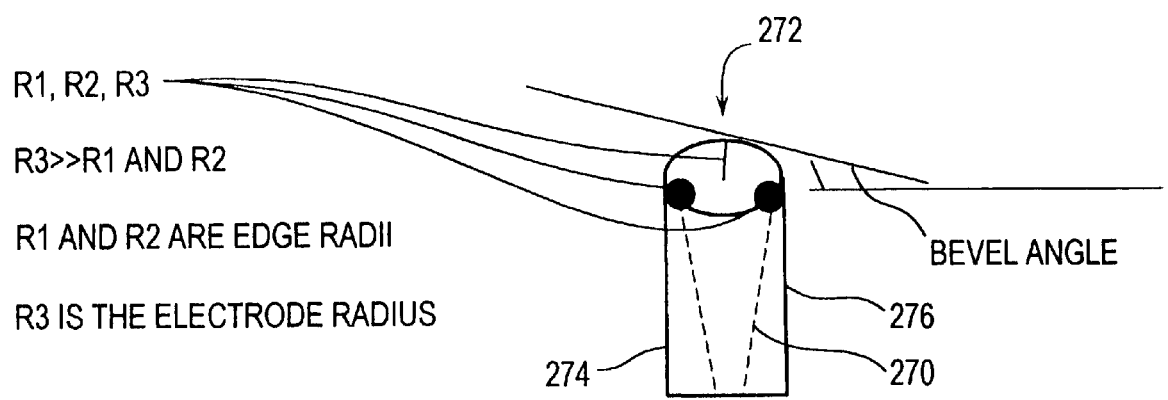

In an effort to improve electrode life, particularly anode life, and avoid the detriments of discharge splitting, applicants propose an electrode as illustrated schematically in FIG. 25b. There is shown an anode 270. It will be understood that the anode 270 may be the insert, as shown with respect to element 254 in FIG. 25a, intermediate metal front side and rear side portions, 258,260, or may be a blade, e.g., blade 82, e.g., as shown in FIG. 13, intermediate a front side ceramic fairing 84 and a rear side ceramic fairing 86.

The anode 270, like the insert 254 of FIG. 25a and the blade 82 of FIG. 13 has generally straight side walls 274, 276. According to an embodiment of the present invention the anode 270 may be formed having a generally elliptical crown portion 272 which is shown to have intersections with each of the respective sidewall portions 274,276 along a radius of curvature and to be tilted, i.e., its long axis is tilted to the horizontal by, e.g., about 4.5° in the direction opposite to that of the differential erosion shown in FIG. 25a. In this manner, the anode 270 may be formed with a beveled top that is beveled away from the differential erosion side providing a curvilinear upper surface that is raise more on the side where the differential erosion will occur, e.g., the side of the asymmetry of the discharge, e.g., the side of the preionization tube (not shown) and also avoids sharp edges at the intersection of the top portion 272 with the sidewall portions 274,276 and/or due to the insert having a flat top and extending beyond the upper surfaces of the front side portion 258 and/or the rear side portion 260. such an anode, can then serve to promote discharge stability by promoting e-field uniformities. Those skilled in the art will understand that the cathode may be similarly constructed.

The above-described embodiments of the present invention are intended only for explanation and illustration purposes and are not the only embodiments in which the present invention may reside. Those skilled in the art will understand that many modifications and changes may be made to the described embodiments without changing the intent and spirit of the present invention. For example, while anode and cathode have been used for the electrodes respectively that are grounded and connected to high voltage, in truth the cathode could be connected to a high negative or positive voltage and thus in one case be a cathode and in another an anode, electrically speaking, with respect to the grounded electrode, herein called in this context the anode. Similarly, whatever the electrical power configuration, typically one electrode, herein referred to as the cathode, is mounted to the housing of the fluorine gas discharge laser, which historically is grounded, and the cathode historically has been the high voltage electrode, and thus must be insulated from the chamber, e.g., the top of the chamber. Those skilled in the art will understand that it is possible to not have the chamber at ground, though not likely, and the aspects of the present invention that relate to modifications influenced by or dictated by the interconnection of what is herein called the cathode and the insulating mechanism, the main insulator, are not limited to the particular electrode actually being electrically the cathode. Similarly the fluorine chemistry and the different interactions with fluorine and, e.g., the formation of reefs naturally and the impact of artificially forming reefs are independent of the denomination of the particular electrode as a cathode or anode. They are dictated by current flow and ion attractions. The use of cathode or anode in this application and in the claims will be understood to be a convention common in the industry today with the grounded electrode in electrical contact with the grounded chamber housing being referred to as the anode and the high voltage electrode insulated from the housing being referred to as the cathode. However, equivalents of the claimed invention will be understood by those skilled in the art to exist where, electrically speaking, the anode of the present application is a cathode and vice versa. Other metals and alloys that have properties similar to those discussed in the present application may also form equivalent substitutes as those skilled in the art will appreciate.

We claim:

1. A gas discharge laser having a laser gas containing fluorine comprising:
   a gas discharge electrode comprising:
   a copper and copper alloy electrode body having an upper curved region containing the discharge footprint for the electrode comprising copper and a lower portion comprising a copper alloy;
   wherein the electrode has a facing portion facing a discharge region, the facing portion of the electrode being formed in an arcuate shape extending into straight line portions on either side of the arcuate portion, the straight line portions terminating in vertical straight sides, with the boundary between the copper and copper alloy including at least the arcuate portion.

2. The apparatus of claim 1 further comprising:
   the electrode comprising a bonded element machined from two pieces of material the first made of copper and the second made of a copper alloy bonded together before machining.

3. The apparatus of claim 1 further comprising:
   the electrode comprising a bonded element machined from two pieces of material the first made of copper and the second made of a copper alloy bonded together before machining.

4. A method of making an electrode for a gas discharge laser having a laser gas containing fluorine comprising:
   fabricating the electrode utilizing a copper and copper alloy cathode body having an upper curved region containing the discharge footprint for the electrode comprising copper and a lower portion comprising a copper alloy by diffusion bonding the upper curved region to the lower portion wherein the electrode has a facing portion facing a discharge region, the facing portion of the electrode being formed in an arcuate shape extending into straight line portions on either side of the arcuate portion, the straight line portions terminating in vertical straight sides, with the boundary between the copper and copper alloy including at least the arcuate portion; and
   forming the facing portion of the electrode in a arcuate shape extending into straight line portions on either side of the arcuate portion, the straight line portions terminating in vertical straight sides, with the boundary between the copper and the copper alloy including at least the arcuate portion.

5. The method of claim 4 further comprising:
   fabricating the electrode from a bonded element machined from two pieces of material the first made of copper and the second made of a copper alloy bonded together before machining.

6. The method of claim 4 further comprising:
   machining the electrode from a bonded element formed of two pieces of material the first made of copper and the second made of a copper alloy bonded together before machining.

7. A gas discharge laser having a laser gas containing fluorine comprising:
   a gas discharge electrode comprising:
   an electrode body having an upper curved region containing the discharge footprint for the electrode consisting essentially of copper and a lower portion comprising a copper alloy.

8. The apparatus of claim 7 further comprising:
   the facing portion of the electrode is formed in an arcuate shape extending into straight line portions on either side of the arcuate portion, the straight line portions terminating in vertical straight sides, with the boundary between the copper and copper alloy including at least the arcuate portion.

9. The apparatus of claim 7 further comprising:
   the electrode formed by bonding a piece of copper and a piece of copper alloy and thereafter machining to form said upper curved region and said lower portion.

10. The apparatus of claim 8 further comprising:
    the electrode formed by bonding a piece of copper and a piece of copper alloy and thereafter machining to form said upper curved region and said lower portion.

* * * * *